US009189966B2

(12) United States Patent
Li et al.

(10) Patent No.: US 9,189,966 B2
(45) Date of Patent: Nov. 17, 2015

(54) SYSTEM FOR LEARNING TRAIL APPLICATION CREATION

(75) Inventors: Yiqun Li, Singapore (SG); Aiyuan Guo, Singapore (SG); Yan Gao, Singapore (SG); Attila Szabo, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 613 days.

(21) Appl. No.: 13/552,393

(22) Filed: Jul. 18, 2012

(65) Prior Publication Data

US 2013/0297675 A1 Nov. 7, 2013

(30) Foreign Application Priority Data

May 2, 2012 (SG) .............................. 201203224-9

(51) Int. Cl.
| | | |
|---|---|---|
| G06F 17/00 | (2006.01) | |
| G09B 7/02 | (2006.01) | |
| G09B 19/00 | (2006.01) | |
| G09B 29/00 | (2006.01) | |
| G09B 29/10 | (2006.01) | |

(52) U.S. Cl.
CPC G09B 7/02 (2013.01); G09B 19/00 (2013.01); G09B 19/0061 (2013.01); G09B 29/007 (2013.01); G09B 29/10 (2013.01)

(58) Field of Classification Search
None
See application file for complete search history.

(56) References Cited

U.S. PATENT DOCUMENTS

| | | | | |
|---|---|---|---|---|
| 2006/0107209 | A1* | 5/2006 | Chen et al. | ..................... 715/530 |
| 2008/0293032 | A1* | 11/2008 | Lee | ............................... 434/323 |
| 2012/0321175 | A1* | 12/2012 | Hedau et al. | .................. 382/159 |

* cited by examiner

Primary Examiner — Keith Bloomquist
(74) Attorney, Agent, or Firm — K. David Crockett, Esq.; Niky Economy Syrengelas, Esq.; Crockett & Crockett, PC

(57) ABSTRACT

A server configured to create a learning trail application for a geographic area. The server includes a processor configured to: provide a template having a plurality of fields including a location field configured to receive the geographic area and an image archive field configured to receive images; receive template data for placement as the content of one or more of the plurality of fields; receive instructions for determining the placement of the template data into one or more of the plurality of fields; and generate the learning trail application from the template with the received template data. During execution of the application, the application is configured to receive at least one input image, determine whether a match exists between the input images and the content in the image archive field and display the template data associated with the content in the image archive field, when a match exists.

17 Claims, 24 Drawing Sheets

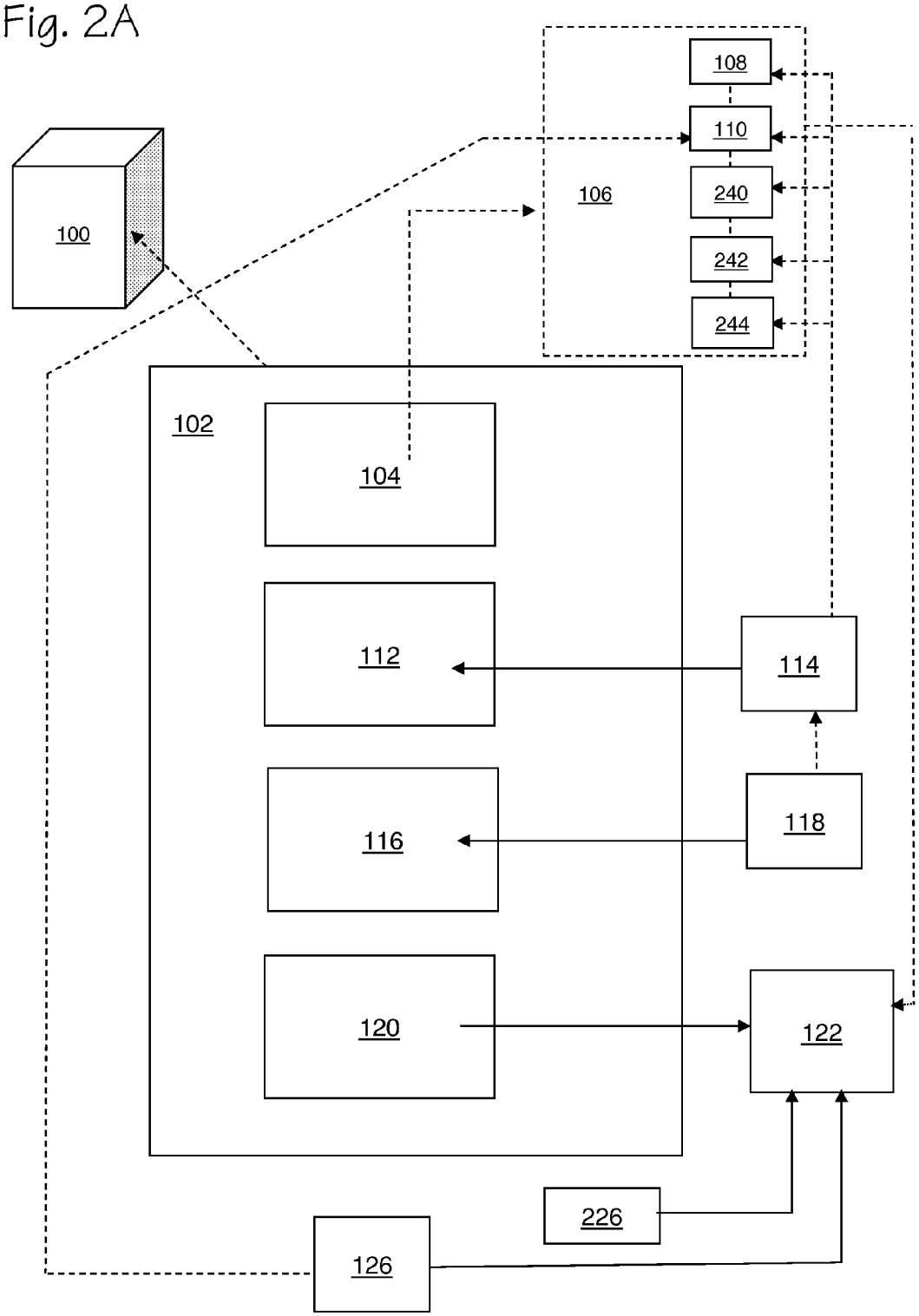

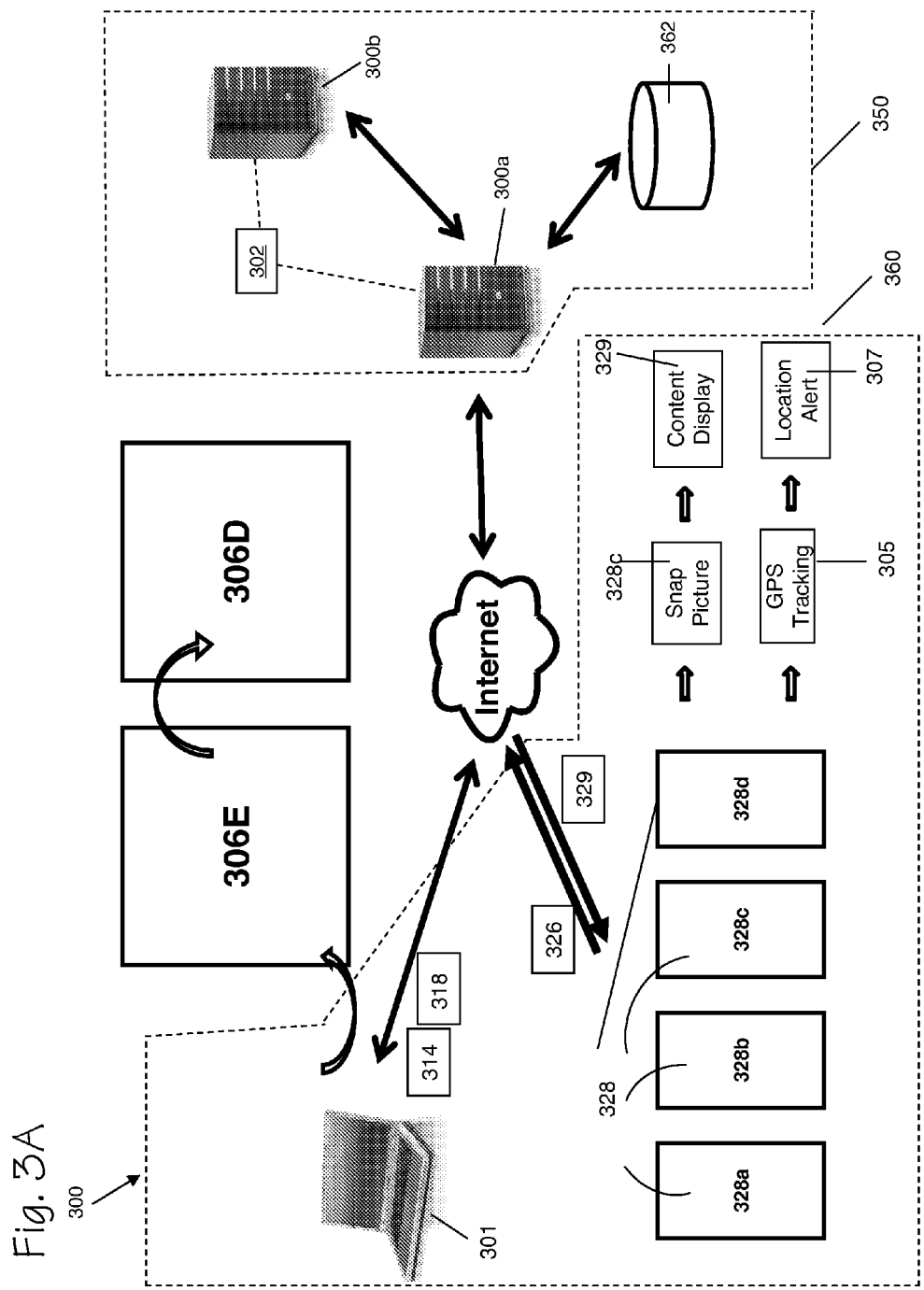

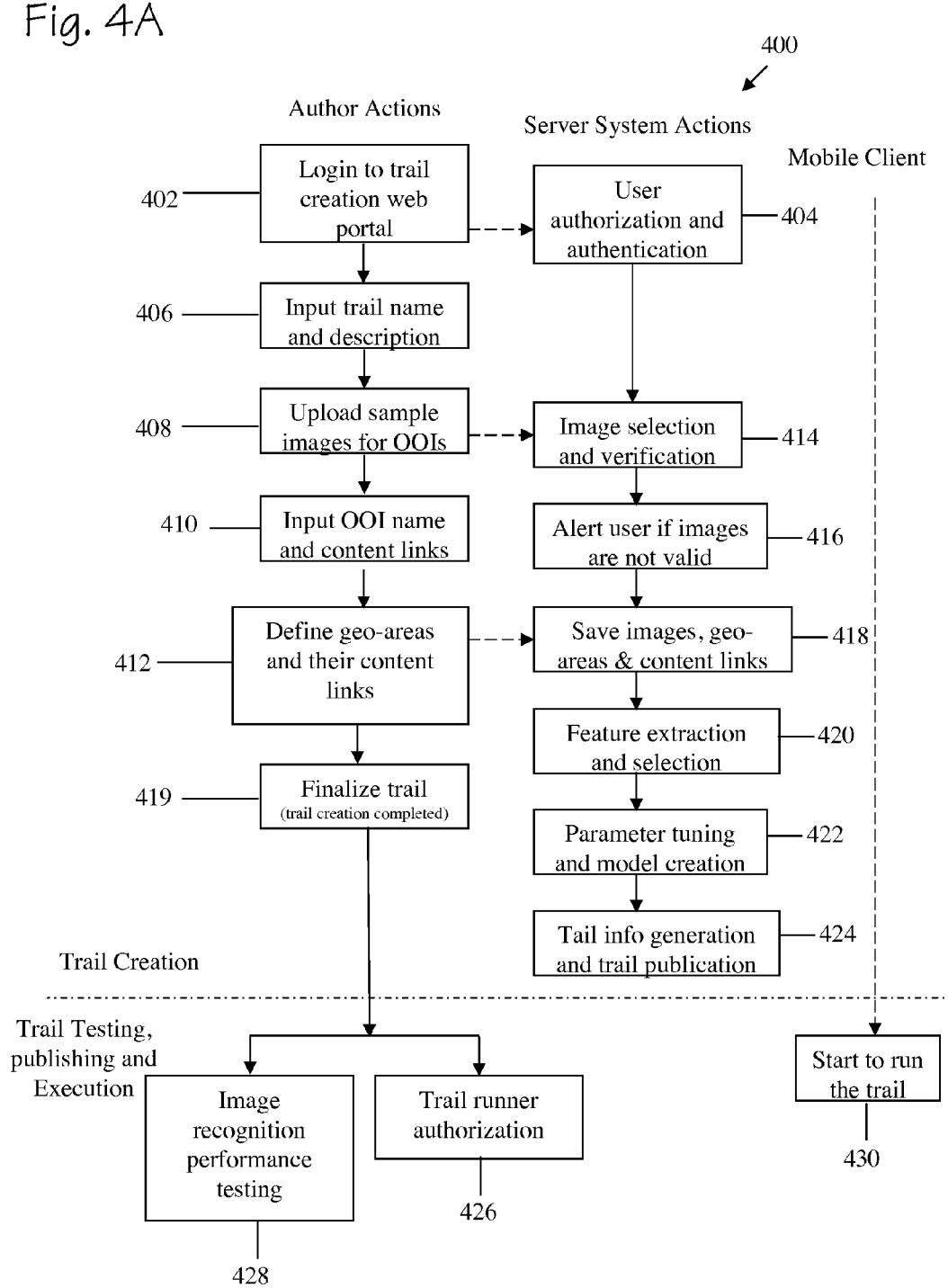

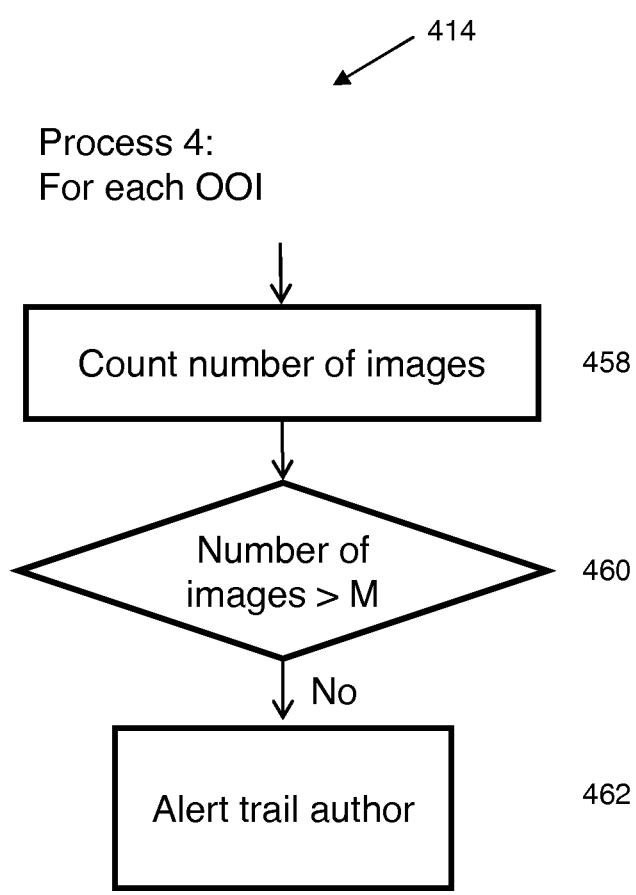

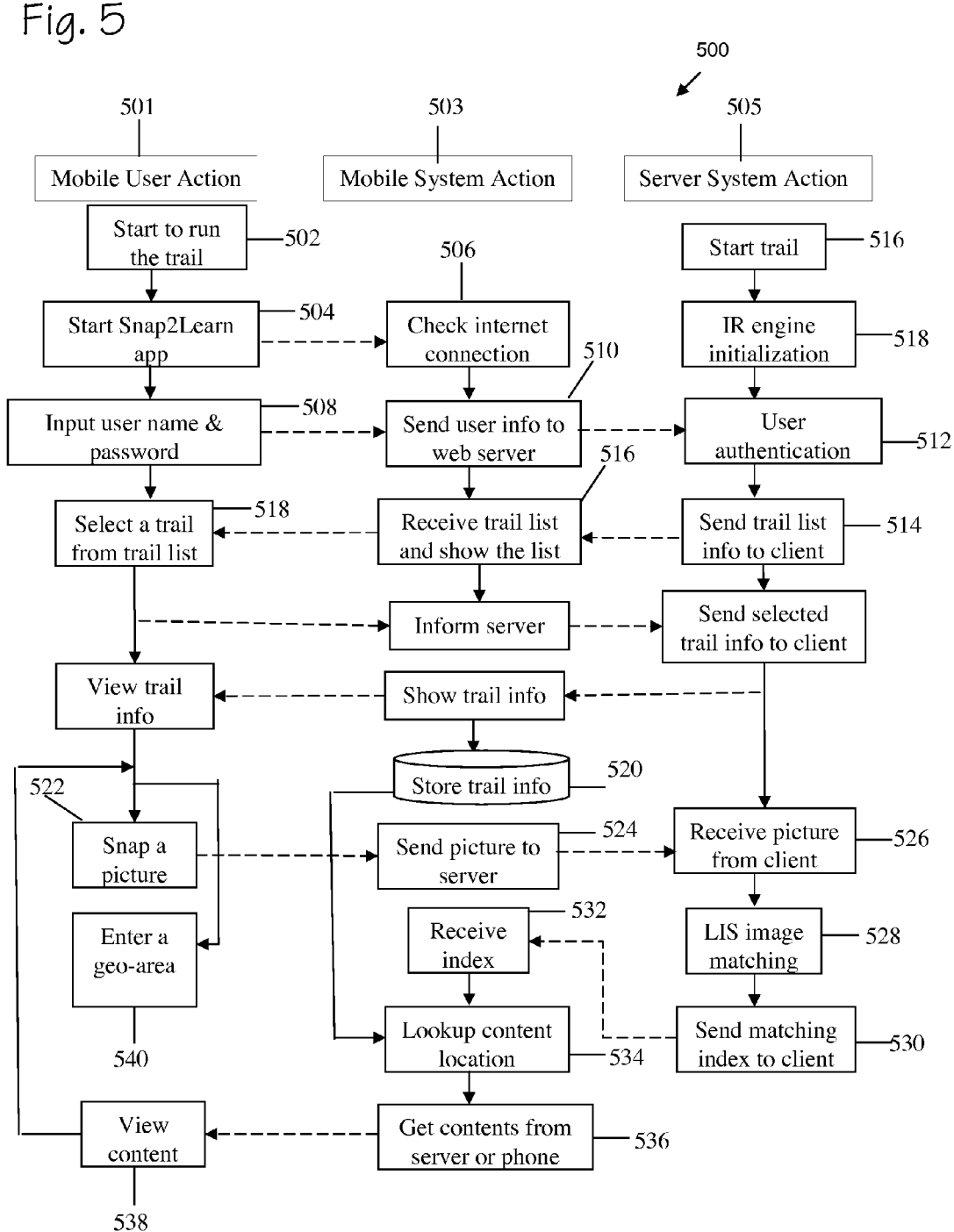

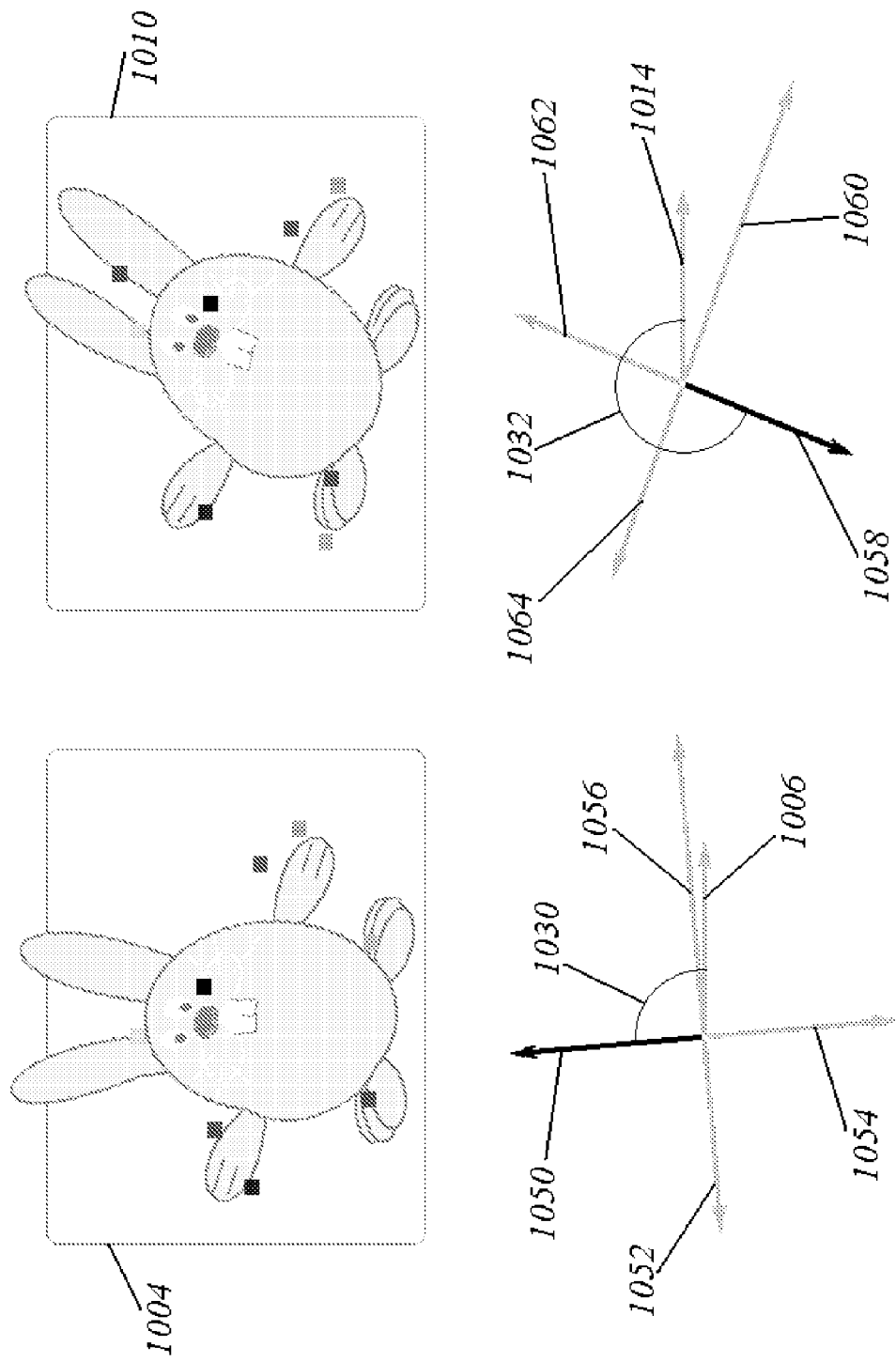

SYSTEM FOR LEARNING TRAIL APPLICATION CREATION

This application claims priority to Singapore Patent Application No. 201203224-9, filed May 2, 2012.

FIELD

Various embodiments relate to a server configured to create a learning trail application for a geographic area.

BACKGROUND

The availability of portable processing devices, such as tablet PCs (personal computer) and mobile smart phones has made it practical to develop applications for learning.

An example of a learning application is a mobile learning trail. A mobile learning trail application is one having content (such as audio, text, images or videos) providing information (such as the history or places of interest) on several areas located within a particular region. For some cases, the content may be associated with a theme. Typically, to enhance a learning experience, such a mobile learning trail application is executed at the particular location for which the mobile learning trail application is designed.

HP Labs has a prototype technology called "Mscape" (http://www.hpl.hp.com/mediascapes/) for developing mobile learning trail applications. The learning application generated by "Mscape" is called "Mediascape". It is a location-based mobile application that incorporates digital media with sights and sounds around the user. Upon the user entering a pre-defined area, corresponding multimedia information (such as digital images, video and audio) will be activated. Games, guided walks, tours, and destinations are examples of "Mediascape" applications.

The sensors which "Mediascape" use to activate a mobile learning trail application are GPS (Global Positioning System), FRID (Radio Frequency Identification) and Bluetooth. A 2D (two dimensional) barcode scanner can also be used to activate the multimedia information, thereby enabling interaction between a physical object and the electronically stored information. However, the use of a 2D barcode is both intrusive and unnatural in that it has to be physically present in the location associated with the mobile learning trail application. It may not be practical to place a barcode on certain objects or to demarcate scenery. Further, effective barcode recognition requires a close capture of the 2D barcode. With a large group of people present, having each person stand close to the barcode to capture an image of the 2D barcode would not be efficient.

A more natural way of image recognition, for retrieving information associated with captured images, is to use freely taken pictures. Google™ has an application, Google Goggles™ for Internet visual search (http://www.google.com/mobile/goggles/#landmark). With this application, people can use a phone to take a picture and search the Internet for information associated with the picture. A similar application—Point & Find™ by Nokia™—assigns tags to taken images (http://pointandfind.nokia.com/), which are archived, and displays these assigned tags for newly taken images which are similar to the archived images. SnapTell™ (http://www.snaptell.com/) provides an application that uses image matching for advertising, where product information can be obtained from a snapped picture of the cover or packaging of a supported product. Such applications allow the use of a phone to take pictures on the move to access relevant information and services on the internet. However, the tools used by Google™, Nokia™ and Snaptell™ to create their respective applications are not accessible by the end user, so that the coverage provided by these applications is limited to what is made available.

SUMMARY

According to one aspect, there is provided a server configured to create a learning trail application for a geographic area, the server including a processor configured to: provide a template having a plurality of fields, each performing a specific function, the plurality of fields comprising a location field and an image archive field, the location field configured to receive the geographic area and the image archive field configured to receive images; receive template data for placement as the content of one or more of the plurality of fields; receive instructions for determining the placement of the template data into one or more of the plurality of fields; and generate the learning trail application from the template with the received template data, wherein during execution of the learning trail application, the learning trail application is configured to receive at least one input image, determine whether a match exists between the input images and the content in the image archive field and display the template data associated with the content in the image archive field, when a match exists.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 2A shows a block diagram representation of a server configured to create a learning trail application according to various embodiments.

FIG. 3A shows a system in accordance with one embodiment.

FIG. 4A shows a process that occurs in creating a learning trail application according to various embodiments.

FIGS. 4B to 4E show flow charts for an algorithm for automatic selection of distinctive and representative sample images.

FIG. 5 shows a process that occurs when accessing a learning trail application, according to various embodiments.

FIGS. 10A and 10B illustrate the implementation of an algorithm used by various embodiments of a learning trail application.

DEFINITIONS

Figure 1:
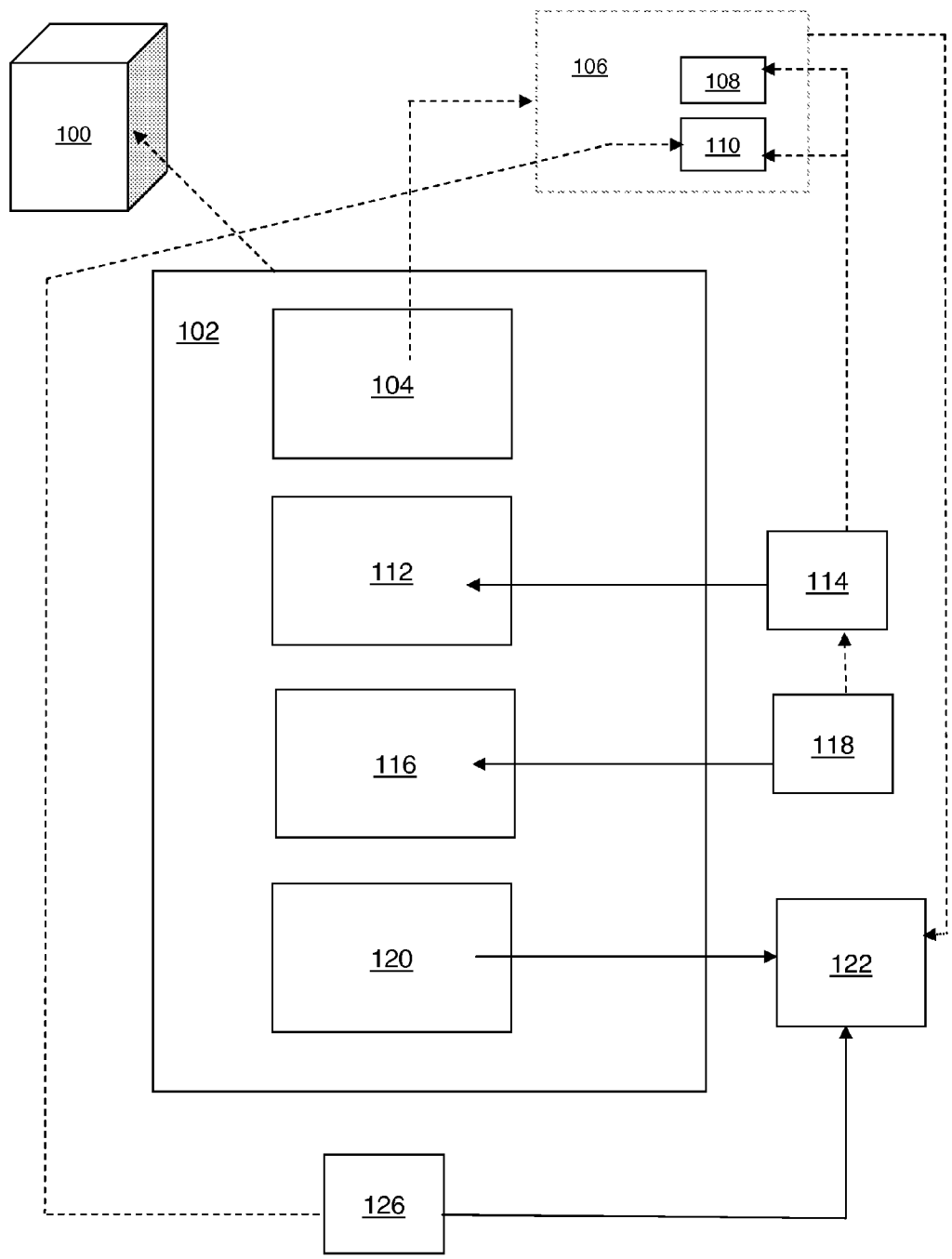
FIG. 1 shows a block diagram representation of a server configured to create a learning trail application according to various embodiments.

The following provides sample, but not exhaustive, definitions for expressions used throughout various embodiments disclosed herein. It will be appreciated that these expressions are used in a computer science context.

The term "server" may refer to a computer hardware system dedicated to running one or more services, as a host computer, to serve the needs of users of other computers in a network, such as the Internet or an Intranet. However, it is also possible that programs utilising the services provided by the server also run on the server itself, rather than on other computers.

The phrase "learning trail application" may mean an application having content (such as audio, text, images or videos) providing information (such as the history or places of interest) on several areas located within a particular region or geographic area, so that a user can learn more about that particular region or geographic area. When creating the learning trail application, some of the content may be configured to be displayed only when a user enters a portion of the geographic area to which that content is associated. The phrase "geographic area" may mean a region or area—such as, but not limited to, a botanic garden, a museum or a cultural heritage site—for which the learning trail application is designed.

The term "processor" may mean an electronic device that is programmable to store instructions and subsequently execute these stored instructions, these stored instructions capable of creating the learning trail application. The electronic device may execute instructions to perform a logic sequence, wherein the instructions may be embedded or programmable by a user. The logic sequence may refer to the implementation of flowcharts of instructions, with the flowcharts looping at one or more portions.

The term "template", may mean a file having a preset format which is used as a starting point to create the learning trail application, so that the format does not have to be recreated each time it is used. The template provides "a plurality of fields", wherein the template may use a graphic user interface (GUI) to display the fields.

The phrase "fields" may mean a space allocated for data that forms the content of the learning trail application. Each of the fields may have a specific "function", i.e. a certain attribute associated with them, such as, but not limited to: to receive image data, to receive audio data, to receive video data, to receive geographic area data, to receive text data and to receive a uniform resource locator (URL). The processor may be configured to process the data in the fields so that only data in the formats for which each respective field is programmed to receive is accepted, while data in other formats is rejected. One or more of the fields may also be configured as to be required, where data must be entered in order to create the learning trail application, while the remaining fields may be configured to be and optional fields which may be left blank.

The term "display sequence" may mean the order in which data received by the template (via its fields) is displayed.

The term "template data" may mean input data, which may be from a user, for entering into the one or more of the plurality of fields. After the input data is processed, it becomes the content of the one or more of the plurality of fields.

The term "instructions" may mean input, which may be from a user, used to determine where the input data is to be placed in the one or more of the plurality of fields.

The term "prompt" may mean a state, during the operation of the learning trail application, where the learning trail application is ready to receive input data, which is separate from the input data used during the creation of the learning trail application. The input data received by the learning trail application is to allow operation of the learning trail application to proceed and thereby facilitate full execution of the learning trail application.

The term "match" may mean a resemblance to a sufficient degree, between the input images and the content in the image archive field against which the input images are compared, so that an identical resemblance is not required.

The term "accessing application" may mean an application that is specifically designed to access and process the content of the learning trail application. Accordingly, in various embodiments, the accessing application runs one or more learning trail applications that are created or generated. The accessing application acts as a holder for these learning trail applications.

DETAILED DESCRIPTION

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

The invention may also be implemented as hardware modules. More particular, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

FIG. 1 shows a block diagram representation of one embodiment, having a server 100 that acts as a host computer in a network of computers (not shown) in a network.

The server 100 is configured to create a learning trail application 122 for a geographic area. The server 100 includes a processor 102 having various processing blocks 104, 112, 116 and 120.

Block 104 has the processor 102 configured to provide a template 106 having a plurality of fields, each performing a specific function. In various embodiments, the specific function may cause the learning trail application 122 to perform an action, such as requesting input data. The plurality of fields comprise a location field 108 and an image archive field 110. The location field 108 is configured to receive the geographic area (for which the learning trail application 122 is created). The image archive field 110 is configured to receive images indicated to be within the geographic area. Various embodiments may also include further fields (not shown) such as one to receive video, text or audio files. The template 106 determines a display sequence in which content in the plurality of fields is displayed in the learning trail application.

As the template 106 already uses embedded coding to achieve the specific function of each the plurality of fields, creation of the learning trail application 122 does not require an author to have computer programming knowledge or an understanding of how a computer processes images.

Block 112 has the processor 102 configured to receive template data 114 for placement as the content of one or more of the plurality of fields. The plurality of fields are designed for flexibility, with the plurality of fields being able to process multiple formats of data content, including video, audio, power point slides and portable document format, "PDF". Content hosted on any web server, including third party content providers, or data saved locally in a computer accessing the template 106 may be used.

Block 116 has the processor 102 configured to receive instructions 118 for determining the placement of the template data 114 into one or more of the plurality of fields.

Block 120 has the processor 102 configured to generate the learning trail application 122 from the template 106 with the received template data 114. During execution of the learning trail application 122, the learning trail application 122 is configured to receive at least one input image 126 and determine whether a match exists between the input image 126 and the content in the image archive field 110. When a match exists, the template data associated with the content in the image archive field 110 is displayed.

Accordingly, various embodiments provide for rapid and easy creation of learning trail applications that facilitates learning through taking pictures, or known as "visual interaction". Using pictures (and the image recognition technology used by the processor 102 to match the taken pictures against archived images) taken of objects as a means to identify or learn information about the objects, is intuitive and convenient. In an embodiment (not shown) where the learning trail application 122 is operated on a mobile phone with a camera, using the camera to take a picture of an object, even when not prompted to do so by the learning trail application 122, will have the mobile phone display information pre-associated to the object. In this manner, various embodiments provide interactivity between users and their surrounding geographic area, the interactivity brought about by the information (which may be in the form of text or multimedia, such as audio and video, providing a background and history of the surrounding geographic area and/or providing a clue for the next action, such as moving to a next location to find an object.) displayed in the mobile phone. Therefore, various embodiments facilitate experiential and discovery learning. However, in another embodiment, display information pre-associated to the object may not be related to the geographical area.

Various embodiments allow for the creation of a learning trail application where users look for objects with an identity marker, which signifies that such objects are for photographing, to activate content in the learning trail application. On the other hand, no clues are given to users on what images should be captured. For a randomly captured image, if there is an archived matching image, content associated with the archived matching image will display. If there is no matching archived image, no information will be displayed, or a message is displayed indicating that the captured image is not recognised.

FIG. 2A shows a block diagram representation of another embodiment, which uses the server 100 and the processor 102 shown in FIG. 1.

In addition to the capabilities described with respect to FIG. 1 above, the processor 102 of FIG. 2A is further configured to perform the following functions.

When the learning trail application 122 is created, the processor 102 may be further configured to provide an instruction or information, before the learning trail application 122 is executed, on the images that are supposed to be captured.

During execution of the learning trail application 122, the learning trail application 122 displays the template data 114 that is associated to the input image 126 received during execution of the learning trail application 122. During execution of the learning trail application 122, the learning trail application 122 may prompt a user to provide the input image 126. The processor 102 may be further configured to display an alert message or a pop-up description when a user reaches a location where a picture is to be taken. The message may inform the mobile users what images should be captured and where the images should be captured.

During execution of the learning trail application 122, the learning trail application 122 is further configured to display the template data 114 when the learning trail application 122 receives data 226 (being in addition to the input image 126) generated by sensors operating in a platform (not shown, but may be, for example, a mobile phone) where the learning trail application 122 is executed. The data 226 may include any one or more of the following: GPS data, compass bearing data or accelerometer data. The learning trail application 122 may, in one embodiment, continuously check whether there is an update of such data 226, which would trigger the display of the template data 114 that is associated with the new data. The application may not prompt for input data. Instead, the application may perform a regular check of output data from the GPS, compass and/or accelerometer and, once the data falls in a predefined range, the application will trigger display of the content.

The data 226 may be used by the processor 102 to allow the learning trail application 122 to proceed with the display of the template data 114. The template data 114 which is returned, during execution of the learning trail application 122, depends on the type of the data 226. For instance, for data 226 which comprises location data, the learning trail application 122 may provide a general overview about the location.

The processor 102 is further configured to perform authentication before displaying the template 106. Authentication may be performed by checking whether a user identification and corresponding password is identical to records stored in a database. The processor 102 may be further configured to have the template 106 accessible by a web browser application. Examples of web browser applications include Internet Explorer™ and Mozilla Firefox™.

The processor 102 is further configured to receive instructions for associating the content (denoted by the dotted lines connecting reference numerals 108, 110, 240, 242 and 244) between one or more of the plurality of fields.

The template data 114 comprises information relating to the received images 126 or geographic area. The information relating to the geographic area becomes the content of the image archive field 110.

The plurality of fields of the template 106 further comprises a question field 240 configured to receive questions related to the geographic area and an answer field 242 configured to receive answers to the respective questions in the question field 240. The template data 114 provides the content for the question field 240 and the answer field 242. In various embodiments, the content for the question field 240 are questions related to the geographic area for which the learning trail application 122 is designed and the content for the answer field 242 are the respective answers to these questions. With the question field 240 and the answer field 242 activated, the learning trail application 122 will prompt for an input, from the function performed by the question field 240. The input data 126 received and used by the learning trail application 122 will then comprise replies (by users of the learning trail application 122) to questions from the content of the question field 240. The learning trail application 122 is also further configured to determine whether the replies match the content in the answer field 242.

The question field 240 and the answer field 242 thus allow for education service providers to cater a learning trail application 122 for a specific outdoor excursion. In a learning trail facilitated by such a learning trail application 122, the replies to questions posed by the question field 240 can be submitted to the server 100 for consolidation and marking. These questions further enhance the learning experience already provided with the use of pictures mentioned above and make for an interesting, intuitive and interactive mobile learning experience.

The template data 114 comprises geographic area for placement into the location field 108 of the template 106. The template data 114 also comprises images within the geographic area for placement into the image archive field 110 of the template 106.

Figure 2B:
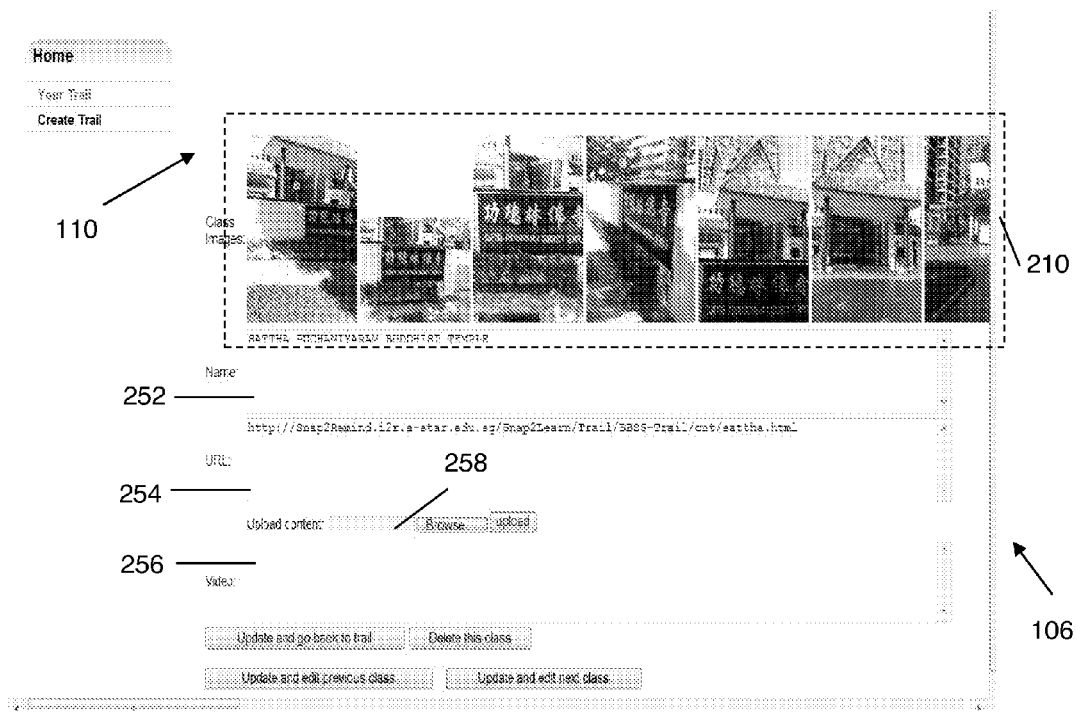
FIG. 2B shows a screen capture of a graphic user interface, provided by various embodiments.

FIG. 2B shows a screen capture of an instance of a graphic user interface, according to various embodiments, employed by the template 106 to create the learning trail application 122.

FIG. 2B shows that the template 106 has a name field 252, a URL field 254, a video field 256 and an upload field 258. The screen capture also shows images 210 of a location within the geographic area, the images 210 being placed into the image field 110 of the template 106. The name field 252, the URL field 254 and the video field 256 become content that is associated, through the image field 110, with the images 210.

Consider an embodiment where only the name field 252 (which is used to indicate the name of the location within the geographic area) is required. If the other fields 254 and 256 are left empty, the returned content will be search results (using an Internet search engine, for example, Google™) for the text data in the name field 252. If only the URL field 254 has data comprising a website address and the video field 256 is blank, the website will be displayed. If the video field 256 contains a video and the URL field 254 is empty, the video will be played. If both the video field 256 and the URL field 254 have respective data, the website will be displayed. Superimposed over the website will be a button to play the video. The upload field 258 is configured to create a URL in the server 100 (see FIG. 2A) for files (such as .pdf (portable document format), .ppt (Microsoft PowerPoint™) or any images in the format of which it can be displayed on a webpage such as .jpg, .gif and .png) that are entered into the upload field 258. If the upload field 258 has any such file, the processor 102 (see FIG. 2A) will create a URL in the server 100 for the uploaded file. The address of the created URL will be shown in the URL field 254. If the URL field 254 has data, it will be overwritten with the address of the created URL. As an alternative to containing a video file, the video field 256 can contain a URL address that hosts a video file or an audio file.

Returning to FIG. 2A, the processor 102 is further configured to process the images within the geographic area with an algorithm to select images that are representative of the geographic area and to remove noise from the selected images.

The template data 114 may further comprise images captured from an object of interest for placement into the image archive field 110 of the template 106, the object of interest being an object to which information is associated. Further, the processor 102 is further configured to process the images captured from the object of interest with an algorithm to select images that are representative of the object of interest and to remove noise from the selected images.

In various embodiments, the learning trail application 122 is configured to be executable in any location, even beyond the geographic area for which the learning trail application 122 is designed. Thus, the content which is not associated with any geographic areas of the learning trail application 122 is displayable when the learning trail application 122 is executed in a location that is not within the geographic area for which the learning trail application 122 is designed. As a further optional parameter, the learning trail application 122 is configured to have at least a portion of the template data 114 displayed only when the learning trail application 122 is executed in a specified segment of the geographic area. The portion of the template data 114 that is displayed is associated with the specified segment of the geographic area. In an embodiment (not shown) where the learning trail application 122 is operated on a mobile phone running a GPS (Global Positioning System) application, the learning trail application 122 can use the GPS application to identify the location where the learning trail application 122 is being operated. If the GPS application returns data indicating a location that is not within the geographic area for which the learning trail application is designed, the content will not be displayed. However, the learning trail application 122 may still be operating in the background. In this manner, the learning trail application 122 allows for location based content activation. Another optional feature (not shown) is a field in the template 106 that utilises accelerometer data, for embodiments where the learning trail application 122 is to be executed on a mobile phone (not shown) with an in-built accelerometer. An accelerometer senses movement and gravity and thus can sense an angle at which a mobile phone is being held. Several fields may be provided to receive accelerometer data from a mobile phone and during creation of the learning trail application 122, data can be input into these several fields. For instance, the several fields may contain a threshold inclination angle (such as 30 to 40 degrees) which when exceeded, will activate content to be displayed in the mobile phone executing the learning trail application 122.

The learning trail application 122 may be stored on the server 100, although the learning trail application 122 can also be downloadable into a platform that is separate from the server and executable on the platform. In various embodiments, the separate platform may include a client computer that is connected to the server 100 over the Internet or a mobile phone.

The processor 102 may be further configured to provide an accessing application that is configured to run the learning trail application 122, wherein the accessing application is configured to operate on the platform that is separate from the server. In various embodiments, the accessing application is required to be installed to access and run the learning trail application 122. The accessing application may be further configured to perform authentication before running the learning trail application.

The processor 102 is further configured to use an algorithm to determine whether the match exists between the input images 126 in the learning trail application 122 and the content in the image archive field 110.

Figure 3B:
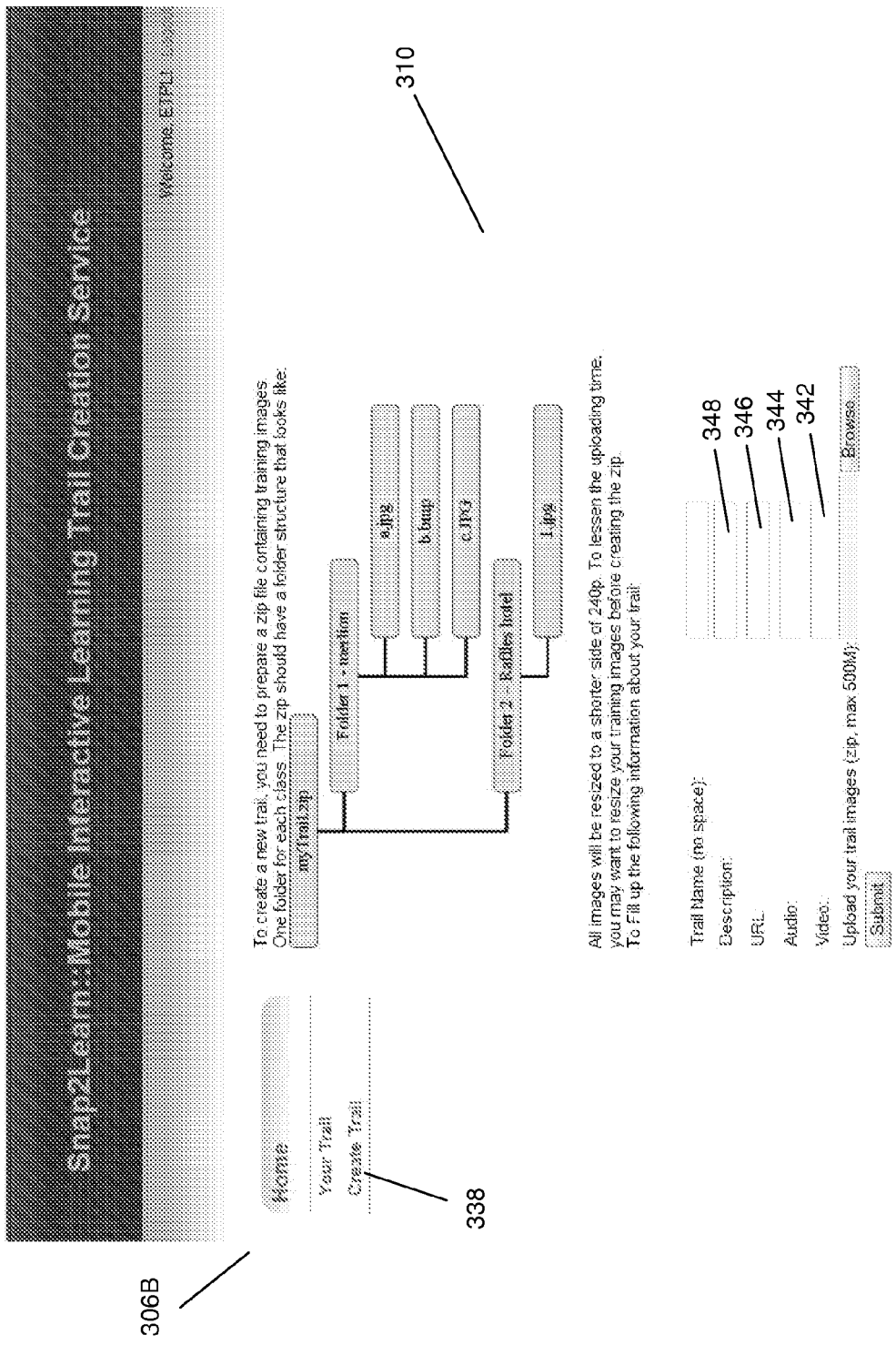
FIGS. 3B to 3F respectively show screen captures of a graphic user interface provided by various embodiments.

FIG. 3A shows a system 300 in accordance with one embodiment. In the following paragraphs, the system 300 will be described in conjunction with FIGS. 3A to 3F.

The system 300 allows creation of learning trail applications having customisable content, which in one exemplary embodiment, may be based on specific curriculum. Other embodiments have the learning trail applications designed to provide a guided tour of a geographic area, a game (such as a treasure hunt in a geographic area) or even an advertisement. Thus the system 300 is not only limited to providing learning trail applications that are used for academic purposes.

There are 2 parts in the system 300, a server-end 350 and a client-end 360. At the server-end 350, applications provide tools for authors to create learning trail applications in accordance with various embodiments. At the client-end 360, applications provide interface(s) for mobile users to run or access the learning trail applications that are in accordance with various embodiments.

Figure 3C:
Figure 3D:
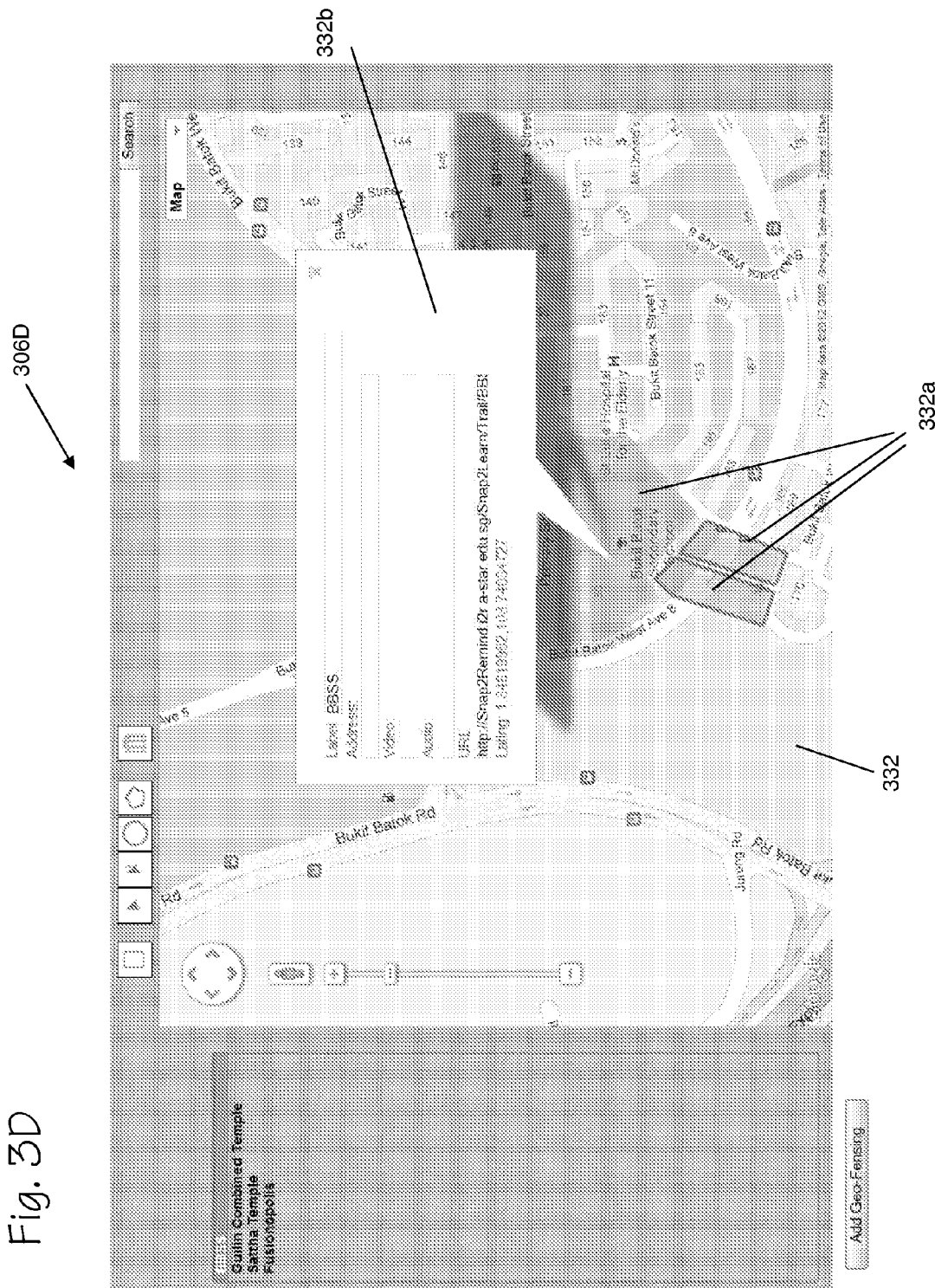
Figure 3E:
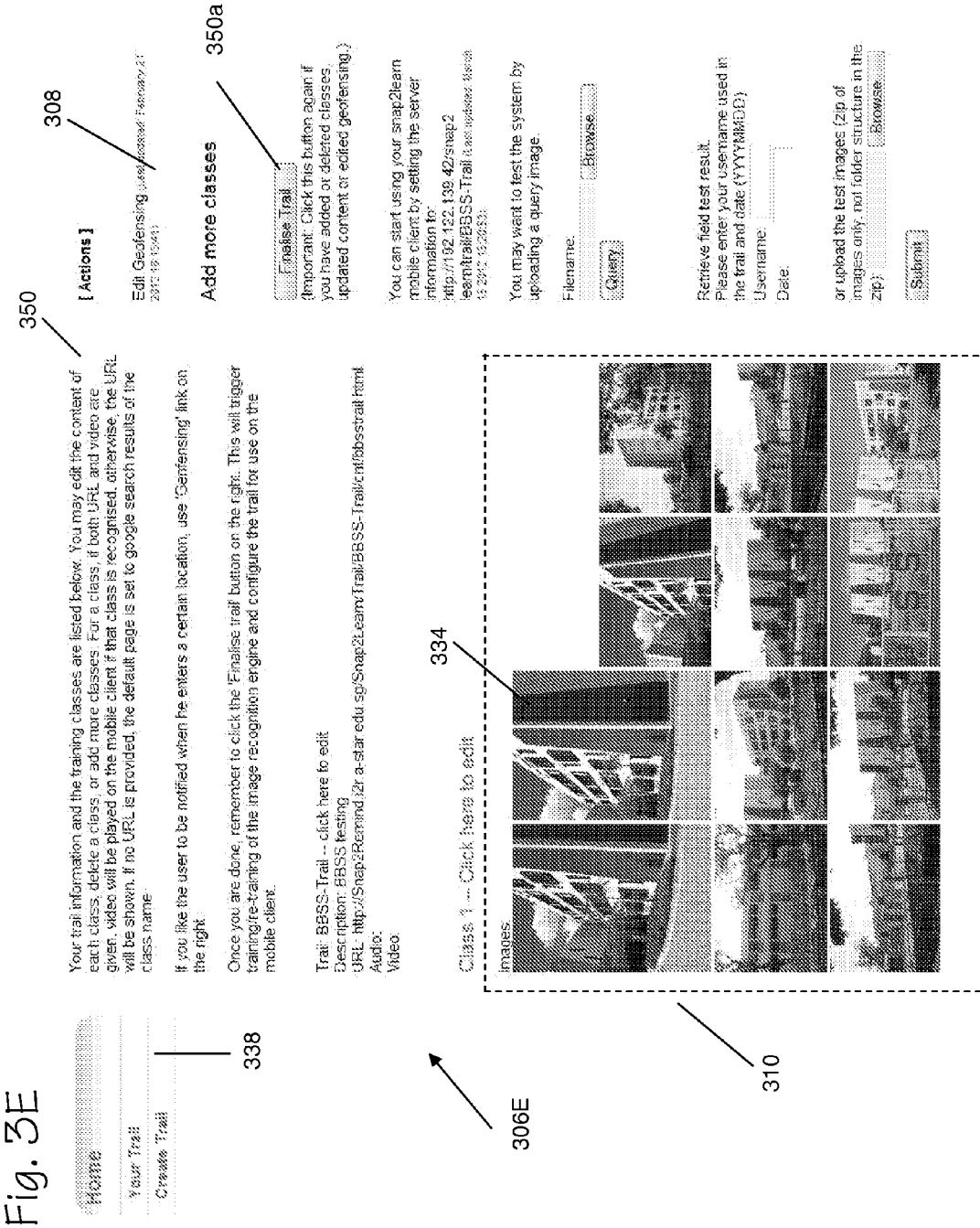
Figure 3F:
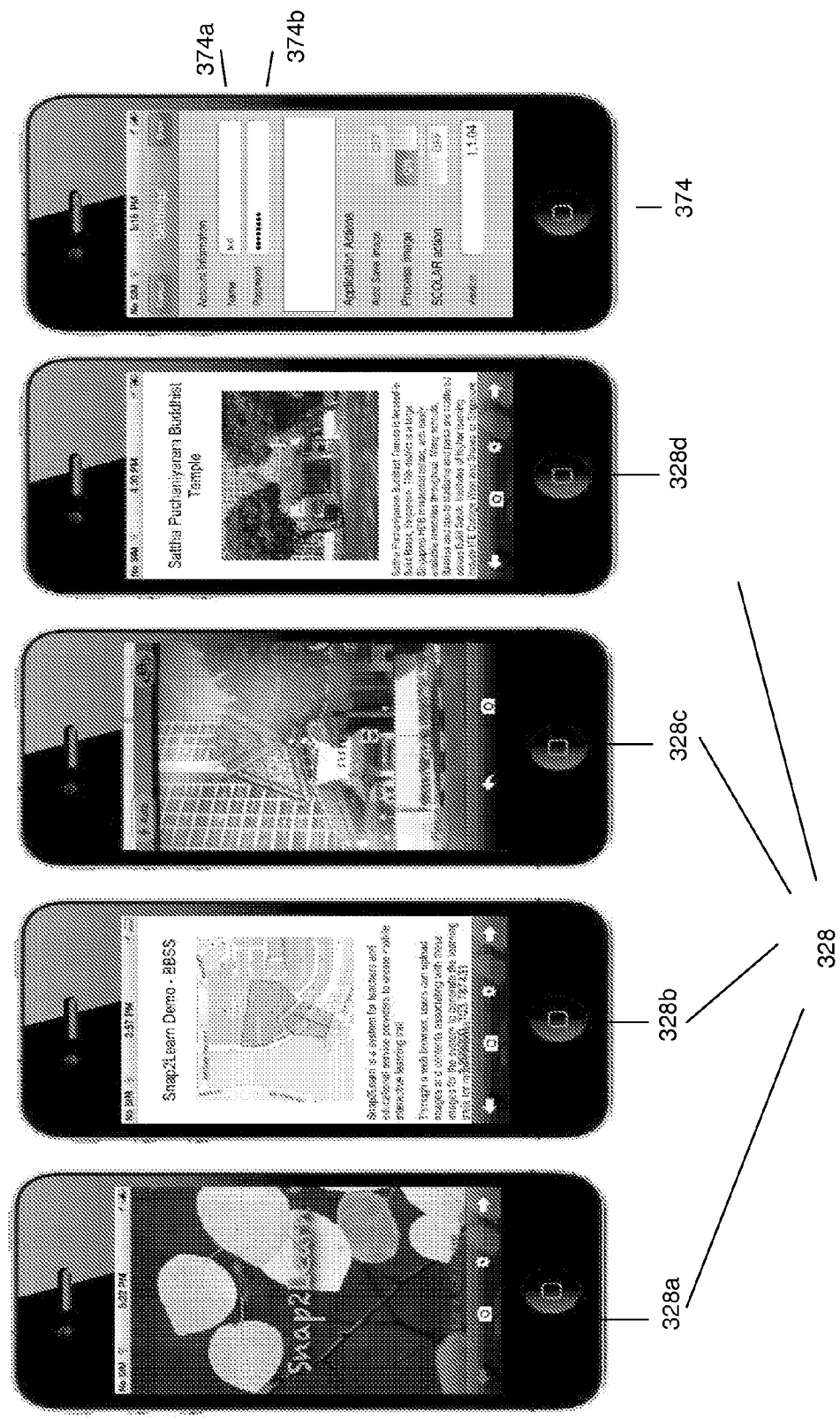

At the server-end 350, one or more of the servers (300a, 300b) is configured to create a learning trail application 328 (represented by reference numerals 328a, 328b, 328c and 328d in FIG. 3A, while FIG. 3F shows that these reference numerals are screen captures of the learning trail application 328) for a geographic area 332.

The server (300a, 300b) includes a processor 302, which is configured in a similar manner to the processor 102 of FIGS. 1 and 2.

Accordingly, the processor 302 is configured to provide a template. The template is represented by screen captures 306B, 306C, 306D and 306E (see FIGS. 3B to 3E respectively) of the graphic user interface (GUI) provided by the template. The template has a plurality of fields (see 308, 310, 342, 344, 346, 348 and 338 from FIGS. 3B to 3E), each performing a specific function.

FIGS. 3B to 3E respectively show screen captures 306B, 306C, 306D and 306E of the graphic user interface (GUI) provided by the template. The GUI allows for a user to enter data into the plurality of fields (see 308, 310, 342, 344, 346, 348 and 338 from FIGS. 3B to 3E) and enables ease of use in uploading content that is used to create the learning trail application 328. The plurality of fields (see 308, 310, 342, 344, 346, 348 and 338 from FIGS. 3B to 3E) comprise a location field 308 and an image archive field 310. The location field 308 is configured to receive the geographic area 332. The image archive field 310 is configured to receive images, which may be images indicated to be within the geographic area 332 or may be images of an object of interest, i.e. an object to which information is associated. Such an object need not necessarily be located in the geographic area 332 and information on the object is input during creation of the learning trail application 328. Other fields of the template include: a video field 342; an audio field 344; a URL (Uniform Resource Location) field 346 to provide a reference to an Internet resource (such as a website), so that the content of the Internet resource is displayed during execution of the learning trail application 328; a text field 348; and a button 338 to create the learning trail application 328.

Returning to FIG. 3A, the template may in one embodiment determine a display sequence in which content in the plurality of fields (see 308, 310, 342, 344, 346, 348 and 338 from FIGS. 3B to 3E) is displayed in the learning trail application 328. However, in another embodiment, there is no display sequence, so that the content in the plurality of fields (see 308, 310, 342, 344, 346, 348 and 338 from FIGS. 3B to 3E) may be triggered by a user taking a picture or entering a particular segment of the geographic area 332. As the template already uses embedded coding to achieve the specific function of each the plurality of fields, creation of the learning trail application 328 does not require an author to have computer programming knowledge or an understanding of how a computer processes images. The template may be accessed through a web portal to create the learning trail application 328, so that the template is accessible by a web browser application.

The processor 302 is configured to receive template data 314 for placement as the content of one or more of the plurality of fields (see 308, 310, 342, 344, 346, 348 and 338 from FIGS. 3B to 3E).

The processor 302 is configured to receive instructions 318 for determining the placement of the template data 314 into one or more of the plurality of fields (see 308, 310, 342, 344, 346, 348 and 338 from FIGS. 3B to 3E).

The processor 302 is configured to generate the learning trail application 328 from the template with the received template data 314. During execution of the learning trail application 328, the learning trail application 328 is configured to receive at least one input image 326. The input image 326 may be transmitted pictures taken using a camera integrated into a mobile phone (as depicted in 328c, but also see FIG. 3F). In one embodiment, the processor 302 is further configured to determine whether a match exists between the input images 326 and the content 334 in the image archive field 310. However, in another embodiment where the learning trail application 328 is operated on an external platform (see reference numerals 328a, 328b, 328c and 328d), a processor in the external platform may be configured by the learning trail application 328 to determine whether a match exists between the input images 326 and the content 334 in the image archive field 310. For either embodiment, when a match exists, the template data 314 associated with the content 334 (see FIG. 3E) in the image archive field 310 is displayed. The associated template data 329 may be transmitted for display in a mobile phone (as depicted in the screen shot 328d, but also see FIG. 3F).

The system 300 provides a web portal to access the template to create the learning trail application 328. At the client-end 360, the web portal provides an interface through which a user will log into via any web browser, whereby authentication may be performed before access to the template is allowed.

Using a web portal to access the template to create the learning trail application has the following advantages:

1. No application installation is required, in that it is sufficient to use a default web browser already present in a client computer 301

2. Access to the template, via the web portal, is independent of the operating system (OS) of the client computer 301.

3. Ease of access control, account management and access rights. Only authorised users can access the created trail applications by entering their username and password. For new sign-ups, their accounts will remain pending until approved or rejected by the web portal administrator, who can review the user account details. It is also possible to restrict access such that authors (i.e. the creators of learning trail applications according to various embodiments) can view only their own created applications, while the web portal administrator can view trail applications created by all authors.

4. Ease of content management. Authors can upload images to the web server (300a, 300b), which can be saved into the respective file folder for the created learning trail application. Authors can also input content, which will be saved in database.

5. Ease of monitoring and notification. The web portal administrator will be notified by email about new account requests and new learning trail applications. Authors will also be notified by email about account activation and a duration in which their created learning trail application will be hosted on the web server (300a, 300b).

6. Learning trail application management and sharing. An author can publish and share his learning trail application and its content with other authors either for free or at a cost.

The following procedure may be used to create the learning trail application 328:

In a first step, the author uploads sample images, as part of the template data 314, to be placed into the image archive field 310 (see FIG. 3B) for each Object Of Interest (OOI) within the geographic area 332 (see FIG. 3C). The OOI may be places of interest, such as historic sites; heritage buildings or structures; and monuments. These sample images are used to train the image recognition algorithm used by the image recognition server (for example 300b) to recognise the input images 326, i.e. have the processor 302 access whether there is a match between the input images 326 and the sample images. The author can define an operation duration of the learning trail application 328, which serves to optimize a running time of the image recognition server 300b, as each learning trail application 328 requires a certain amount of memory even when the learning trail application 328 is dormant. The author also uploads further data, being the remainder of the template data 314, which is used as content of the plurality of fields (see 308, 310, 342, 344, 346, 348 and 338 from FIGS. 3B to 3E), such as to edit the geo-fencing area by defining the geographic area 332 (see FIG. 3D). Data defining the geographic area 332 will be recorded to the trail definition file once a pop up window 332b (see FIG. 3D) for content association is closed. The author also associates the content between one or more of the plurality of fields (see 308, 310, 342, 344, 346, 348 and 338 from FIGS. 3B to 3E). An example of content association is shown in FIG. 3C, which shows the template providing fields 336 for the template data 314 (see FIG. 3A) which is to be associated with the content in the image archive field 310. In the embodiment shown in FIG. 3C, the fields 336 allow names to be tagged to the content in the image archive field 310, providing of a link to an Internet resource (such as a website) which may provide more information on the images in the image archive field 310 and the loading of a video providing more information on the images in the image archive field 310.

In a second step, the processor 302 will automatically select the distinctive and representative sample images, remove the noisy and non-informative images, perform feature extraction and optimization and generate the data models for the sample images representing each OOIs. More detail of an algorithm that can select the distinctive and representative sample images is later described, with reference to FIGS. 4B to 4E.

In a third step, once the learning trail application is generated (which may be effected by clicking an appropriate button 350a (see FIG. 3E), tests can be conducted, before publishing the learning trail application. Authors can upload test images to the server (300a and 300b) to test the performance of the image recognition algorithm used by the learning trail application 328. A batch test can be performed to test the recognition accuracy. The testing can also be conducted by capturing images on a computer screen. The author can check whether the learning trail application 328 returns the correct contents for displayed after sending the test picture. After testing, the learning trail application can be published or made available by hosting on the server (300a and 300b).

In a fourth step, authorised users are allowed access to the generated learning trail application. In one embodiment, access to the generated learning trail applications may be through an accessing application, which is configured to access the learning trail applications via the server (300a and 300b).

The accessing application acts as a holder of created learning trails and can be used to run any learning trails created by the authoring system 300. The accessing application may be used to obtain data (images, GPS coordinates, compass and accelerometer data) from built-in sensors of a mobile phone, send data to the server (300a and 300b) and receive data from the server (300a and 300b), as well as display contents of the learning trail application 328. The accessing application may use a private communication protocol to communicate with the processor 302 in the server (300a and 300b). In one embodiment, the accessing application forms part of the system 300 used to run the learning trail applications, so that the accessing application becomes an application that is specifically designed to process the content of the learning trail applications The accessing application provides the following advantages. It can be coded to run on various mobile phone operating systems, such as Apple™'s "iOS" and Google's "Android", Microsoft's Windows phone, RIM's BlackBerry and Nokia's Symbian etc. Further, after a learning trail application is created, it can be immediately published to be accessed by the accessing application.

Publication of a learning trail application may follow the following process:

1. Once the learning trail application creation is completed, a trail definition file will be stored in database 362. All information regarding to the learning trail application are defined in the file. The trail definition file defines the OOIs, the geo-fencing areas and associated contents for the learning trail application. The content will be activated when a user snaps images of these OOIs or enters these geo-fencing areas.
2. The author of the learning trail application can authorize a list of user names who can run the learning trail application.
3. A user installs the accessing application into his mobile phone before he wants to run the learning trail application. The accessing application is only required to be installed once. Thereafter, the user can run different learning trail applications using the same accessing application.
4. The user starts the accessing application in his mobile phone. The accessing application may be configured to perform authentication, whereby the user enters his user name and password to login. Once done, the information will be sent to the server (300a and 300b) for verification.
5. The server (300a and 300b) will check which learning trail applications the mobile user is authorized to run and sends the list of trails back to the mobile phone.
6. The user selects one of the learning trail applications from the list. The user indicates his preference of using online contents or offline contents. In an online mode of operation, content is stored in the server (300a and 300b). Once the content is activated, it will be downloaded to the mobile phone from the server (300a and 300b) and displayed. An Internet connection is required to download the content. In an offline mode of operation, content is stored in the mobile phone. Once the content is activated, the mobile phone will get the content from mobile phone storage for display. There will be an option for the user to choose whether to use online content or offline content when the user selects a learning trail application to run. If offline content is selected, the server (300a and 300b) will send all the contents to the mobile phone together with the trail definition file.
7. The server (300a and 300b) sends the trail definition file of the selected learning trail application and the content of the learning trail application if offline content is selected.
8. The mobile phone stores the trail definition file and the content of the learning trail application if offline content is selected.
9. The user can start to run this learning trail application.

Turning to FIG. 3F, screen capture 328a shows the initiation screen displayed when the accessing application is started. It will be appreciated that in FIG. 3F, the accessing application is configured to operate on a platform that is separate from the server (300a and 300b). Screen capture 374 shows the accessing application performing authentication before access to the learning trail applications is granted. The user's details, such as a name 374a and a password 374b may be requested. Screen capture 328b shows a brief overview of the learning trail application which the learning trail application 328 seeks to have the user follow, the brief overview being part of the template data 346 or 344 or 342 (see FIG. 3B) when the learning trail application 328 was created. Screen capture 328c shows a picture taken of a building within the geographic area for which the learning trail application 328 was designed, the picture being sent to the server (300a and 300b) to retrieve information about the building. Screen capture 328d shows the retrieved information about the building.

FIGS. 3F and 3A thus show that in various embodiments, the learning trail application may be downloadable into a platform that is separate from the server and executable on the separate platform. Such separate platforms include mobile phones, such as the iPhone™ from Apple™ or any phone using the "Android" OS.

Screen captures 328a, 328b, 328c and 328d show various execution stages of the learning trail application 328 operating on an iPhone™. Screen capture 328a shows the initiation screen when the learning trail application is started. The accessing application may make use of data generated by hardware already present within the iPhone™ to activate content of the learning trail application. For instance, using the iPhone™ to take a picture has data 329 sent to the iPhone™, in the manner explained above. Other examples include respective content 307 that is activated in response to an operation of hardware/software (symbolised by reference numeral 305), such as: an electronic compass within the iPhone™ detecting that a user is facing a specific direction; an accelerometer indicating that the iPhone™ is being moved; or a GPS application indicating that the learning trail application is being executed in the geographic area 332 or in a specific segment of the geographic area 332.

FIG. 4A shows a process 400 that occurs in creating a learning trail application according to various embodiments (for instance the learning trail application 328 that is shown and described with respect to FIG. 3). Steps 402, 406, 408, 410, 412, 419, 428 and 426 are actions undertaken by the author of the learning trail application, while steps 404, 414, 416, 418, 420, 422 and 424 are actions undertaken at the server which is used to generate the learning trail application. It will be appreciated that, in the context of various embodiments (for example those described in FIG. 4A and FIG. 5), a process described using steps following an ascending numerical order does not necessarily mean that the process follows the sequential order in which the steps are described.

In step 402, an author logs into a web portal that provides access to a server configured to create a learning trail application according to various embodiments. In step 404, authentication may be performed before the author is allowed to access the server. After authentication, the author may input, in step 406, a trail name, along with a description serving to provide an overview of the learning trail application.

In step 408, the author uploads images for each OOI in the geographic area for which the learning trail application is designed. In steps 410 and 412, each OOI is provided with a name and content, geographical areas for content activation are defined and multimedia content associated to each OOI and the geographic area.

In step 414, the server uses an algorithm to select distinctive and representative images and removes noisy and non-informative images from the uploaded images of step 408. The algorithm processes the uploaded images of step 408, which preferably are images of each OOI from different viewpoints, for the algorithm to better recognise the query image captured from different viewpoints of an OOI and thereby identify the OOI. The algorithm checks whether the uploaded images are representative within their own OOI and distinctive among other OOI.

FIGS. 4B to 4E show flow charts for the algorithm, used in step 414, for automatic selection of distinctive and representative sample images. There are 4 processes in the algorithm.

Figure 4B:
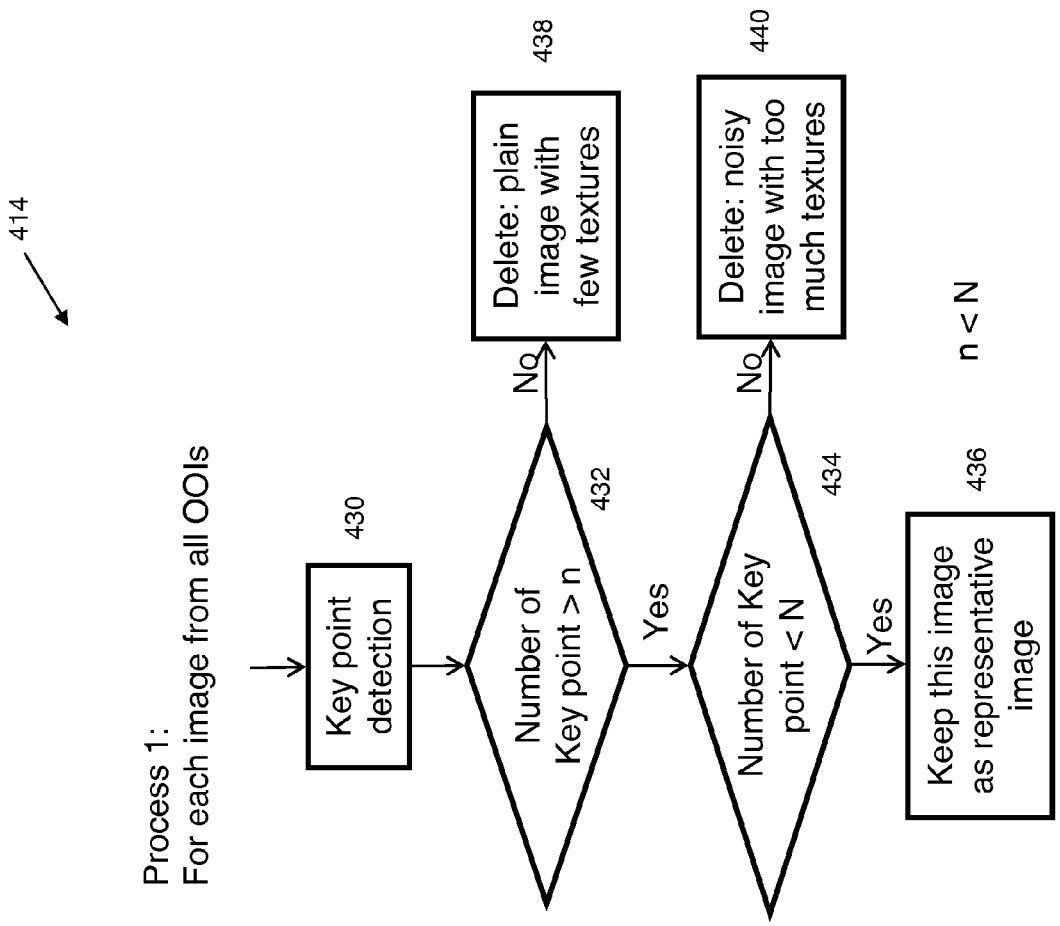

In the first process, shown in FIG. 4B, key point detection will be performed in step 430 for each sample images. If the number of key points is less than a threshold value n, the sample image is considered to be a plain or blur image without much texture. The image will be removed in step 438. In step 434, if the number of key points is larger than a threshold value N, the sample image is considered to have a lot of clutter (such as trees or grass) and the image will also be removed in step 440. In step 436, the sample image is kept as a representative image which has key points greater than the threshold value n, but less than the threshold value N.

Figure 4D:
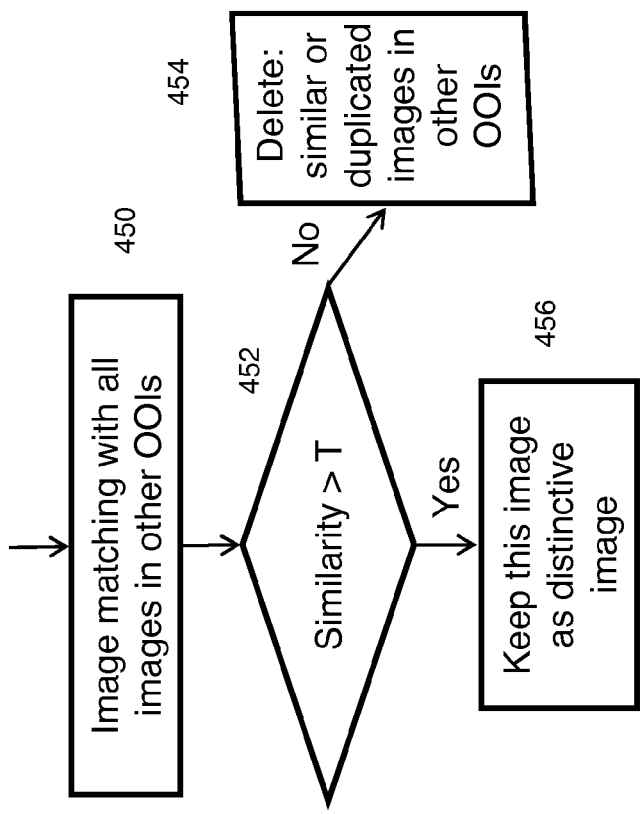
Figure 4C:
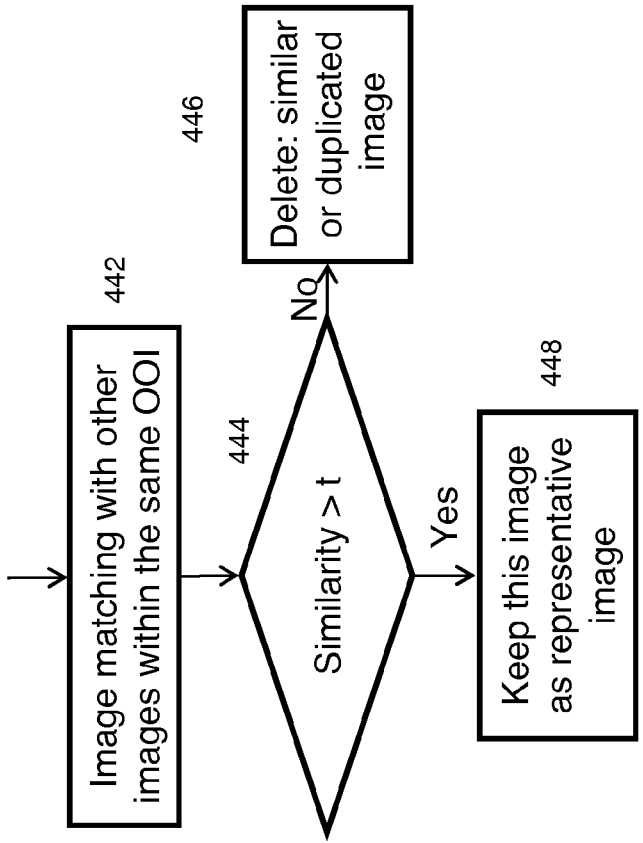

In the second process, shown in FIG. 4C, an image will compared with other images of the same OOI in step 442. If the two images are similar, i.e. above a threshold value t (as determined in step 444), one of the images will be removed in step 446. In step 448, the two images are determined to be representative images and kept.

In the third process, shown in FIG. 4D, each image of an OOI is compared with all the images of other OOIs in step 450. If both images are similar, i.e. above a threshold value T (as determined in step 452), the image in the other OOI will be removed in step 454. In step 456, the two images are determined to be distinctive images and kept.

In the fourth process, shown in FIG. 4E, the number of images of each OOI will be counted in step 458. In step 462, if there are none or not enough images of any OOI (i.e. above a threshold value M), the author will be alerted in step 462. On the web portal GUI (see FIG. 3A), the removed images will be displayed until the author confirms their removal.

Returning to FIG. 4A, if the algorithm detects non-distinctive or non-representative images, the server will inform the user in step 416 that the images are not valid. Images which are not representative and distinctive will be removed from the database on the server. The use of this algorithm thus allows authors, without knowledge in computer vision technology, to provide images that can be used by the learning trail application, since the algorithm will reject images that are not suitable.

In step 418, the distinctive and representative images, along with the geographical areas and content links from steps 410 and 412, are saved.

In step 419, the author finalises the learning trail, signaling to the server to generate the learning trail application according to steps 420, 422 and 424, described in further detail as follows.

In steps 420 to 424, data models for each OOI are generated. In step 420, features are extracted from the distinctive and representative images of the step 418, these extracted features being used for image recognition purposes (i.e. to determine whether a match exists between input images received during execution of the learning trail application). During image matching, it is difficult to determine whether a query image is similar enough to a database image. A set of parameters is normally required to be tuned and adjusted in order to achieve good recognition accuracy. The optimal values for these parameters may depend on the image content. One or more algorithms will automatically tune these parameters to maximize the image recognition performance for each OOI.

Figure 4F:
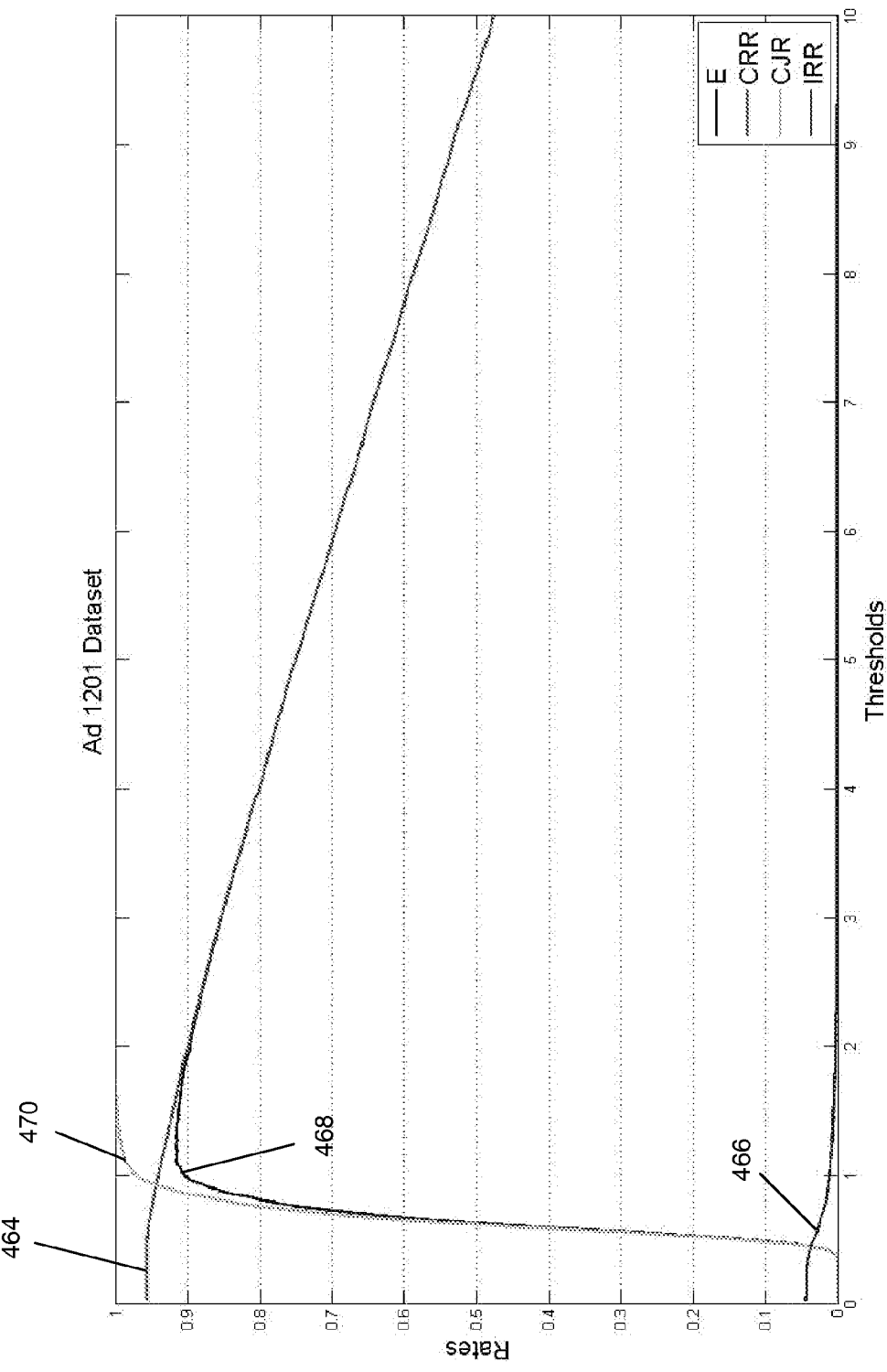
FIG. 4F shows a graph used to tune parameters to maximize image recognition performance, according to various embodiments.

The algorithm may work as follows. From the sample images uploaded to the server, part of the images from each OOI will be randomly selected as test images and the rest of the images will be used as training images. The training images will be used to train the image recognition engine. The test images will be used to query an image recognition engine with a set of preset parameters. The parameters may be one or a few threshold values. A percentage of the correct recognition (correct recognition rate) and incorrect recognition (incorrect recognition rate) will be given after all the test images are used to query the engine. The process is repeated with another set of parameters on another set of threshold values. Another correct recognition rate and incorrect recognition rate will be given. If only one parameter or one threshold value is required, a graph can be generated based on all the test results as shown in FIG. 4F. The images uploaded by the trail authors are captured from predefined OOIs, which are therefore the valid images and should be recognized correctly by the image recognition engine. In the server, a set of invalid images is stored, being images that are not captured from the OOIs. These invalid images are used to test the image recognition engine. From the result the correct rejection rate can be obtained, as shown in the graph of FIG. 4F.

Correct Recognition Rate (CRR), shown as curve 464
Measures the percent of valid images which are recognized correctly.
Equation=(no. of valid test images recognized incorrectly)/(total no. of valid test images)
Incorrect Recognition Rate (IRR), shown as curve 466
Measures the percent of valid images which are recognized incorrectly.
Equation=(no. of valid test images recognized incorrectly)/(total no. of valid test images)
False Rejection Rate (FRR)
Measures the percent of valid images which are incorrectly rejected.
Equation=(no. of valid test images rejected)/(total no. of valid test images)

Correct Recognition Rate+Incorrect Recognition Rate+False Rejection Rate=100%

Invalid Image: Test image which is not captured from a predefined OOI and should not be recognized by the system
False Acceptance Rate (FAR)
Measures the percent of invalid images which are incorrectly accepted.
Equation=(no. of invalid test images accepted)/(total no. of invalid test images)
Correct rejection Rate (CJR), shown as curve 470
Measures the percent of invalid images which are correctly rejected.
Equation=(no. of invalid test images correctly rejected)/(total no. of invalid test images)

False Acceptance Rate+Correct Rejection Rate=100%

The objective is to maximize the correct recognition rate and correct rejection rate, and minimize the incorrect recognition rate. A simple way is to maximize E, shown as curve 468, which is defined as $$E=(CRR \times CJR)/(1+IRR)$$

In that case, a threshold can be selected.

Returning to FIG. 4A, in step 424, the server finalises the trail creation and publishes the learning trail application into the web portal.

In step 426, the author can set restrictions so that only authorised users can have access to the learning trail application. In step 428, image recognition performance of the learning trail application can be evaluated. In step 430, a user can run the learning trail application.

Thus, the above process 400 enables rapid and easy creation of interactive learning trails applications, with authors of the learning trail application not required to have any programming skill or knowledge in computer image processing technology.

FIG. 5 shows a process 500 that occurs when accessing a learning trail application, according to various embodiments (for instance the learning trail application 328 that is shown and described with respect to FIG. 3), to run the learning trail application in a platform such as a mobile phone. Column 501 in FIG. 5 denotes actions taken by an operator of the mobile phone, column 503 shows actions taken by the mobile phone operating system and column 505 shows actions taken at the server which hosts a learning trail application according to various embodiments.

In step 502, the user decides to start a learning trail and initiates in step 504 an accessing application in his mobile phone that can communicate with the server that hosts the learning trail application.

After an author of the learning trail application creates the trail, the learning trail application can be started by clicking on a "Finalize Trail" button in step 516. The Image Recognition engine will be initialized in step 518. After that, authorized mobile users can start to run the learning trail application in step 512. When a user wants to run a learning trail application, the user must start the accessing application described above in step 504. The accessing application will check the internet connection in step 506. If the connection is not available, the accessing application will alert the user. After user inputs the user name and password in step 508, the information will be sent to the server in step 510 for user authentication in step 512. If the user information passes the authentication, the server will send the trail information to the user's phone in step 514. The phone receives the information in step 516. After that, the user will be able to view the trail description and start to run the trail.

In step 516, the mobile phone receives configuration information defined in the trail definition file for the learning trail application, and stores in step 520, the configuration information of the selected learning trail application.

In step 518, the user goes through the overview of the learning trail application, where the user may be prompted, in step 522, to take a picture of an OOI. The taken picture is sent, in step 524, by the mobile phone and received, in step 526, by the server. The server processes, in step 528, the taken picture to determine whether a match exists with archived images. When a match exists, the server will send, in step 530, an index of the content that is associated with the matching archived image to the mobile phone. The mobile phone receives, in step 532, the index and locates, in step 534, an address where the associated content is stored in the mobile phone when the learning trail application was installed in step 520. The mobile phone then retrieves, in step 536, the associated content from the address or retrieves the associated content from the server for viewing, in step 538, by the user.

From the step 518, the user may enter, in step 540, a segment of the geographic area for which the learning trail application is designed. When this occurs, the server may send (not shown) to the mobile phone content that is associated with that segment of the geographic area.

Figure 6:
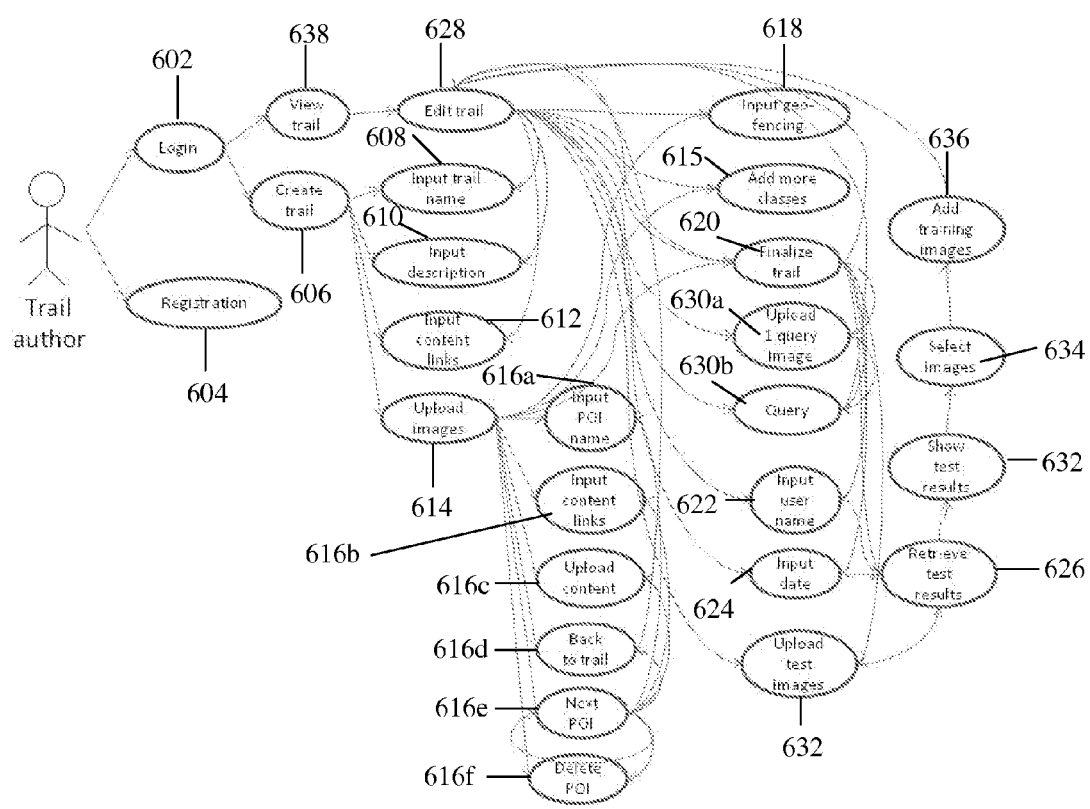
FIG. 6 shows use cases of a web portal used to create a learning trail application, according to various embodiments.

FIG. 6 shows how the display of a GUI, used to create a learning trail application according to various embodiments, changes from user interaction. Software based on "Apache", "PHP", "Mysql database", "JavaScript (Goggle map)" and/or "Mercury mail" may be used to create the web portal which hosts the GUI.

The GUI display will change at various stages, such as when a user logs in at stage 602 and enters registration data in stage 604. After log in, the GUI may show a screen asking whether a learning trail application is to be created at stage 606 or whether the user would like to view the trials that are already created.

At stage 638, the GUI will display a screen (see 628) that allows the user to edit the learning trail application parameters.

From stage 606, the GUI will display a screen that allows a user to input the learning trail application name (see 608), to upload images (see 614), input content links (see 612) and input a brief description of the created learning trail application (see 610).

When images are uploaded (see 614), the GUI will show a screen that allows users to input the name of the OOI (see 616a), links to websites that provide information on the images (see 616b), upload video or audio content (see 616c). Options are provided for the user to return to a previous page (see 616d) or to include a new OOI (see 616e) or delete the OOI that is presently shown (see 616f).

When the user wishes to edit a learning trail application (see 628), the GUI will show a screen that allows more OOIs to be included (see 615). Similarly, when a geographic area needs to be defined (see 618), the GUI will show a screen that allows the user to enter geographic area data by drawing circles or irregular shapes on a map (see 332a in FIG. 3D).

The GUI also has screen displays allowing for input when testing is to be performed on a sample image (see 630a, 630b and 632). A display is also provided for a user to input his name (see 622), a date (624) when the testing is done and test images for a user to upload (see 632). Once the above is done, the user can click on a button to retrieve the test results (see 626) and the test results (see 632) will be displayed. From the screen showing the test results, images can be selected (see 634) and used to further train an image recognition engine (see 636) used by the GUI.

From the arrows linking the various reference numerals shown in FIG. 6, it will be appreciated that the screen displays provided by the GUI are directly linked (such that the user can immediately move between two screen displays) or indirectly linked (such that the user has to access a screen display through one or more screen displays). The left column in Table 1 below shows user operation on a GUI, while the right column in Table 1 shows background corresponding server system actions.

TABLE 1

| Learning trail application author actions | Server System Actions |
| --- | --- |
| Login to learning trail application creation web portal | User authorization and authentication; user registration |
| Input for OOI: name; description; content links; sample images to create learning trail application | Save images to hard disk; update learning trail application database |
| Input OOI name; input content links; upload content; back to trail (which returns the GUI to display a previous page); enter details for a next OOI; delete an OOI | Update learning trail application database |

TABLE 1-continued

| Learning trail application author actions | Server System Actions |
|---|---|
| Input a geographic area | Invoke Google map ™ API (application programming interface), save geographic area data |
| Finalize the learning trail application | Perform image selection, feature extraction and selection, model training and parameter tuning Create learning trail application definition files and publish the trail Authorise users |
| (Optional) Test image recognition algorithm by uploading a query image or perform the testing by uploading a batch of query images; | Execute corresponding query programs and display results. |
| (Optional) Retrieve test results from the query images through input of username and date that the test was conducted; select images from the displayed test results and use the selected images for training the image recognition algorithm | Locate the field test folder. Read log file. Display results. |
| (Optional) Add more OOIs to the learning trail application, delete trail, edit learning trail application | Perform corresponding updates to database and file system |

Figure 7:
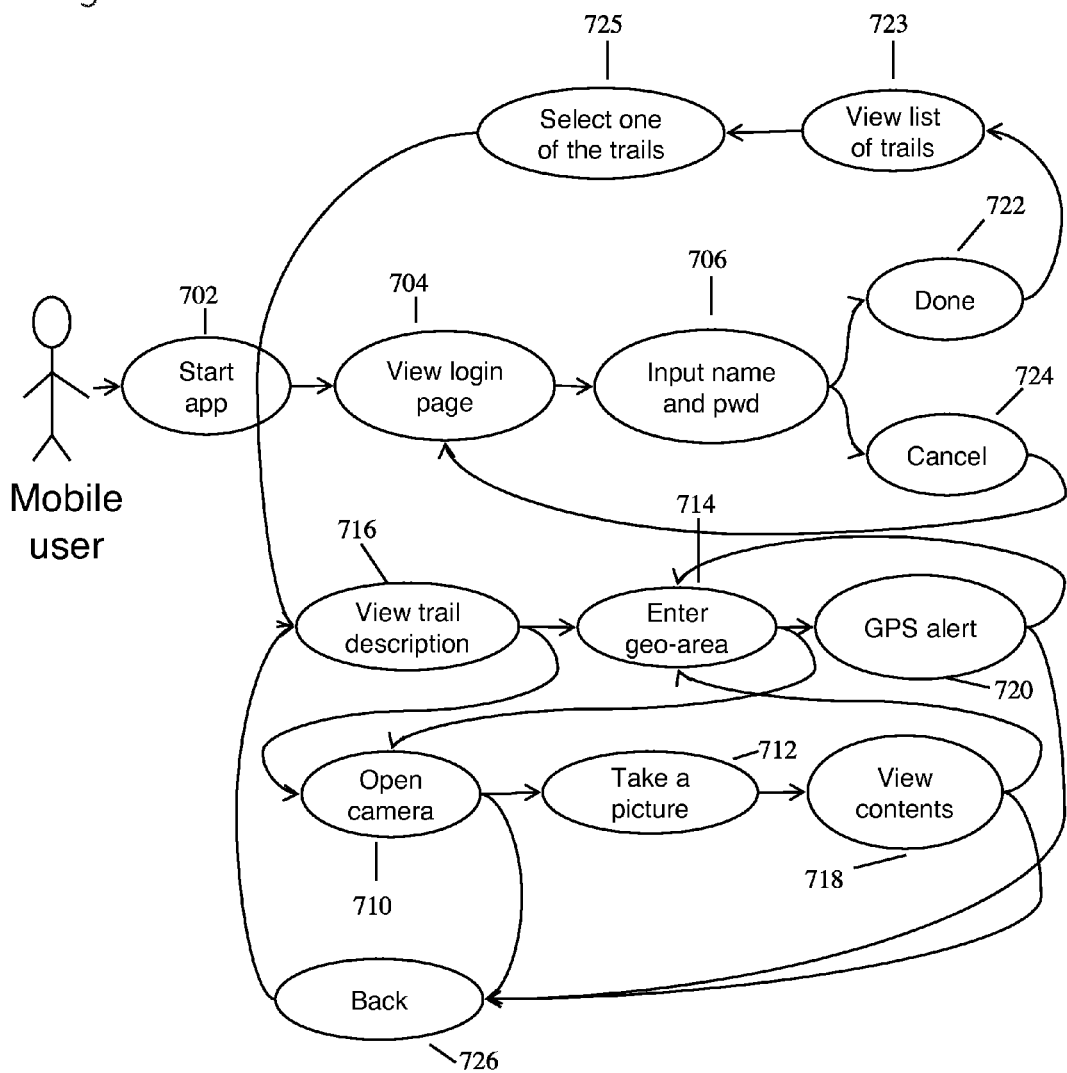
FIG. 7 shows use cases when a mobile phone accesses a learning trail application, according to various embodiments.

FIG. 7 shows how the display of a mobile phone, used to run a learning trail application, according to various embodiments, changes from user interaction.

The mobile phone display will change at various stages, such as when a user starts the accessing application in stage 702. At stage 704, the user sees the accessing application login page and can register by entering his user name and password (see 706). After log in is done at 722, the mobile phone may display a list of learning trails (see 723). The user may select one of the learning trails (see 725) and a brief description of the learning trail application (see 716) will be displayed. When the user starts the camera of the mobile phone (see 710), the display will change and the user can take a picture (see 712) or return to the previous screen (see 726). If a picture is taken and there is a matching archive image, content associated with the archive image will be shown (see 718).

When the user moves to a predefined geographic area (see 714), the mobile phone may change its display to show the content associated with this geographic area (see 720).

The left column in Table 2 below shows user actions on a mobile phone accessing a learning trail application, while the right column in Table 2 shows background corresponding mobile phone/server actions.

TABLE 2

| User Actions | Mobile phone/Server Actions |
|---|---|
| Start the accessing application used to access the learning trail application | Mobile phone check internet connection and prompts user if connection is not available |
| Login via user name and password | Mobile phone sends user name and password to server Server verifies user name and password Server sends the authorized trail list to mobile phone Mobile phone show trail list |

TABLE 2-continued

| User Actions | Mobile phone/Server Actions |
|---|---|
| User selects a trail to run | Mobile phone sends trail request to sever Server sends learning trail application definition file to mobile phone for application configuration Server sends description of learning trail application to mobile phone Client receives and displays learning trail application description Mobile client turns on GPS tracking |
| User view learning trail application description | |
| Open camera | Mobile phone camera activated |
| Take picture | Mobile phone sends picture to server for image recognition Server recognizes the image and returns an index to client Mobile phone looks up the content location using the index and the learning trail application info file. Mobile phone gets the contents from phone storage or server and display to the phone screen |
| View contents | Mobile phone displays contents |
| Move within geographic area | Mobile phone compares GPS coordinates with pre-defined geographic areas on the learning trail application definition file. Mobile phone looks up the content location Mobile phone gets the contents from phone storage or server and display to the phone screen |
| Cancel action; confirming selection; going back to previous action | Mobile phone performs corresponding actions |

Figure 8:
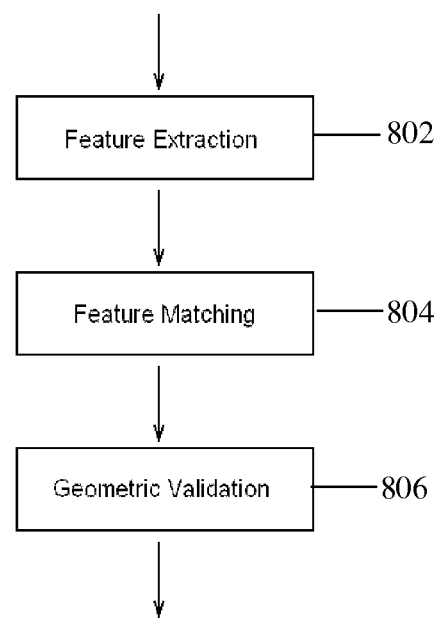
FIG. 8 shows steps of image matching, according to various embodiments.

FIG. 8 shows steps used by an algorithm for creating a learning trail application, according to various embodiments, where the algorithm is used to determine whether a match exists between input images to the learning trail application and an image archive of the learning trail application.

In various embodiments, a "keypoint" refers to a feature where the concern is the coordinate where the feature is located on an image. According to various embodiments, geometric validation is concerned with the image coordinates of features. A "feature", according to various embodiments, may refer to a region of an image that is informative about the image, such as a region that is distinctive from its surrounding region. For example, for an image of a face, the corner of an eye of the face provides a good feature. However, a uniform region of the image (such as a blue sky) provides a bad feature. Accordingly, in various embodiments, matching features may mean a pixel from a query image that has a matching pixel (in terms of attributes like colour intensity and the percentage from, for example, one or more of the colour components: red, green, blue, cyan, magenta, yellow and black) in a stored image. According to various embodiments, the feature may include a descriptor and image coordinates. A descriptor may be anything that describes the region, such as colour or an annotation like "edge". In various embodiments, the descriptor may a 64 (or 128) dimension vector. In various embodiments, image coordinates may refer to the location of the feature on the image. A global feature may be one where the region of interest is the whole image. A local feature is one where the region of interest is a small part of the whole image. In various embodiments, local features may be used.

In step 802, feature extraction is performed. Local scale invariant feature is used for feature extraction on the input images. The input images are represented as a collection of key features. Every feature comprises a high dimensional descriptor and a keypoint (the local image coordinates of the feature). In one embodiment, SURF features are used as descriptors. Further detail can be found in the document "*SURF: Speeded Up Robust Features*", *Computer Vision and Image Understanding* (*CVIU*), Vol. 110, No. 3, pp. 346-359, 2008 by Herbert Bay, Andreas Ess, Tinne Tuytelaars, Luc Van Gool, the entirety of which is incorporated by reference. Another embodiment uses SIFT features. Further detail can be found in the document, "*Object recognition from local scale-invariant features*", *Proceedings of the International Conference on Computer Vision* 2 pp. 1150-1157 by Lowe, David G. (1999), the entirety of which is incorporated by reference. The dimension of SIFT feature is 128, which is twice that of SURF features. Thus, it is preferred to use SURF features due its smaller dimension, so that computation time for image matching is shorter. A feature selection tool is used to select discriminative features and remove redundant features. This is to make sure distinctive and compact features are used to represent each OOI, which will improve the recognition accuracy and shorten computation time.

In step 804, feature matching is performed. A kd-tree (see the document. "*Multidimensional binary search trees used for associative searching*", *Communications of the ACM*, 18(9):509-517, 1975 by J. L. Bentley, the entirety of which is incorporated by reference) is built from all of the descriptors of the image archive of the learning trail application. Using this kd-tree, the approximate nearest neighbors of the descriptors of the query image in the image archive are found. The matching score of an archived image will be the number of matched features between the query image and the archived image. The recognized image will be the image in the database that has the largest matching score, the matching score being larger than a certain threshold.

After feature matching, there will be some key-point pairs between the query image and the archived images, which are most similar to the query. However there are a lot of false outlier matches. Outlier matches can be eliminated by selecting only a subset of the key-point pairs which are geometrically consistent, which is undertaken by performing geometric validation in step 806. The geometrical consistency can be described as a geometric constraint on the spatial coordinates of the matching feature pairs. The goal is to find the largest subset, which satisfies that constraint.

Figure 9:
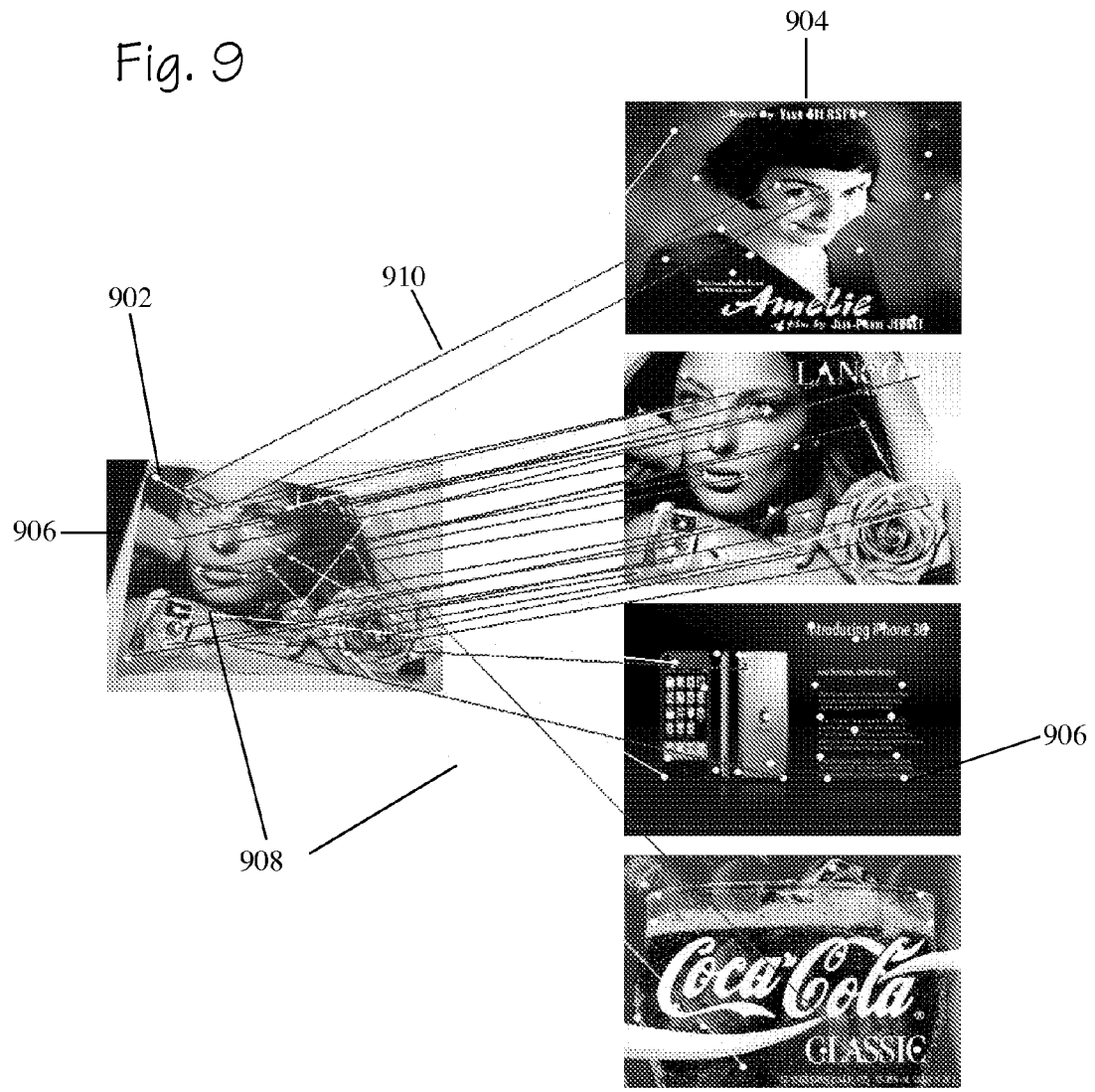
FIG. 9 illustrates an image matching query.

FIG. 9 illustrates an image matching query. An input image 902 is shown on the left and the archived images 904 are shown on the right. The dots 906 represent extracted feature keypoints, while lines 908 and 910 represent matches between the features. The bolder lines 910 are geometrical consistent matches while the fainter lines 908 are the outliers.

Two possible methods supported by a learning trail application, according to various embodiments are homographic RANSAC (RANdom SAmple Consensus) and LIS (Longest Increasing Subsequence), where each uses different geometrical constraints.

For homographic RANSAC, the geometrical constraint is described as follows. It is assumed that a query image can be obtained by applying a homographic transformation on the archived images. Homographic RANSAC is used to select the largest number of key-point pairs, which are consistent with a homographic transformation.

RANSAC is a robust probabilistic method for estimating model parameters, which can be used for any kind of model. In various embodiments, the model is Homographic transformation between images, where the goal is to find the parameters of the homography matrix. At least 4 matching keypoint pairs are needed for estimating the homography matrix.

A RANSAC algorithm can be outlined as follows:
1. Chose 4 matching key-point pairs randomly for parameter estimation of the homography matrix.
2. Compute the homography matrix.
3. Check all key-point pairs against this model, and keep only those (as inliers) whose error is small.
4. Repeat the above three steps until a satisfactory result is found, i.e. the model which provides the largest number of inliers is chosen As an example, the OpenCV implementation of Homographic RANSAC may be used.

In Homographic RANSAC, the assumption is that one image is a homographic transformation from the other and therefore works well on planar images. However, for images of 3D objects, Homographic RANSAC may not work well as the transformation may not be homographic.

LIS works well on either planar images or images of 3D objects. In various embodiments of the learning trail application, there is no prior knowledge on what kind of images authors will be using. It cannot be assumed that images are captured from planar objects. Therefore, LIS is preferred as it can handle both homographic and non-homographic transformations.

The underlining principle for the longest increasing subsequence method is that a set of matched keypoint-pairs are geometrically consistent if their keypoints geometric order is the same in both the input image and the archived image. The geometric order on an image is determined by the image coordinates of keypoints relative to a selected reference axis. The LIS is method is capable of finding the largest subset of matching key-point pairs which are geometrically consistent.

In LIS, a subsequence of a given sequence is found, in which the subsequence elements are in sorted order, lowest to highest, and in which the subsequence is as long as possible. This subsequence is not necessarily contiguous, or unique. The longest increasing subsequence problem is solvable in time O(n log n), where n denotes the length of the input sequence. Further details can be found in Fredman, M.: On computing the length of longest increasing subsequences. Discrete Mathematics 11 (1975) 29-35

Figure 10A:
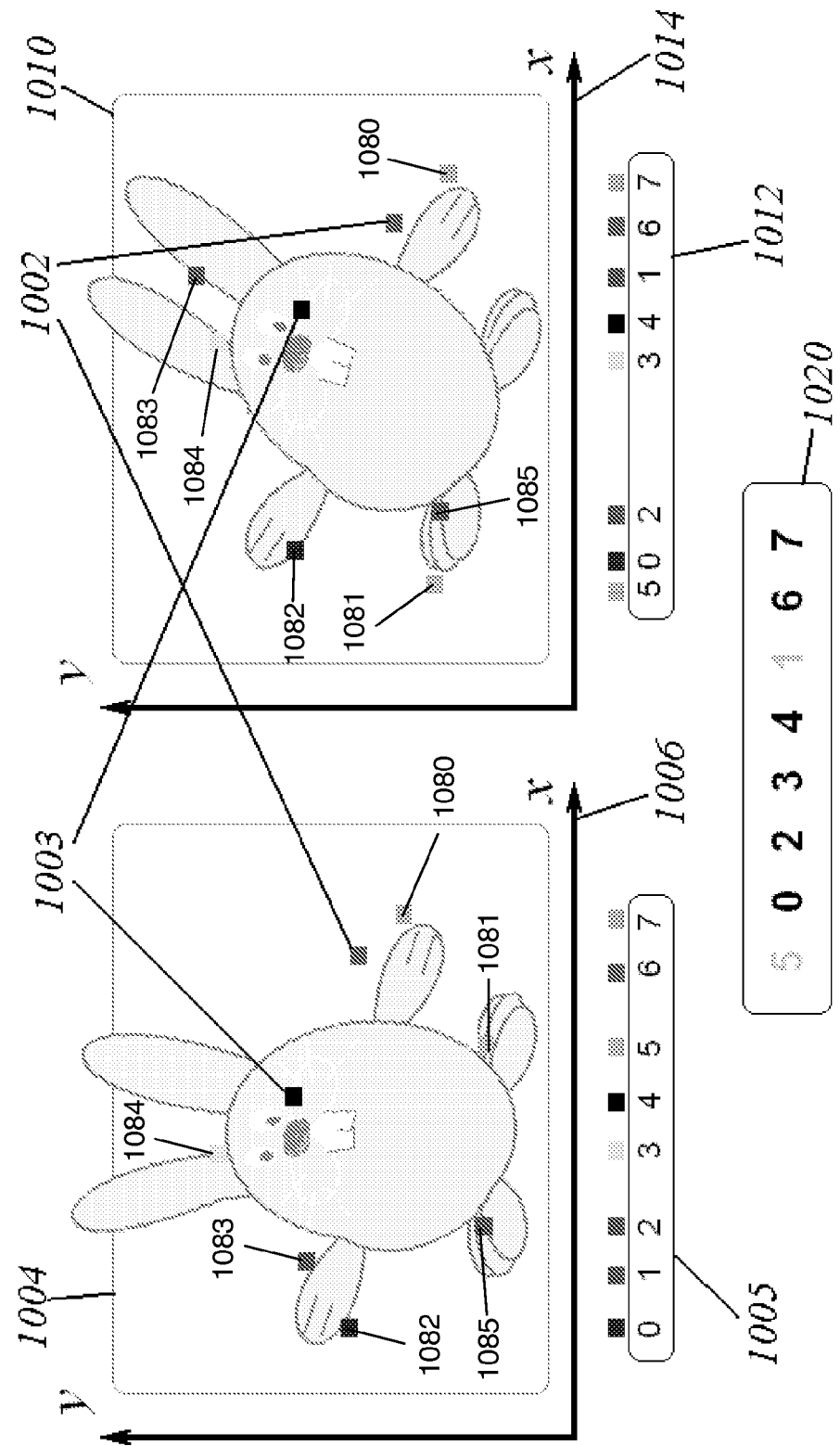
Figure 11:
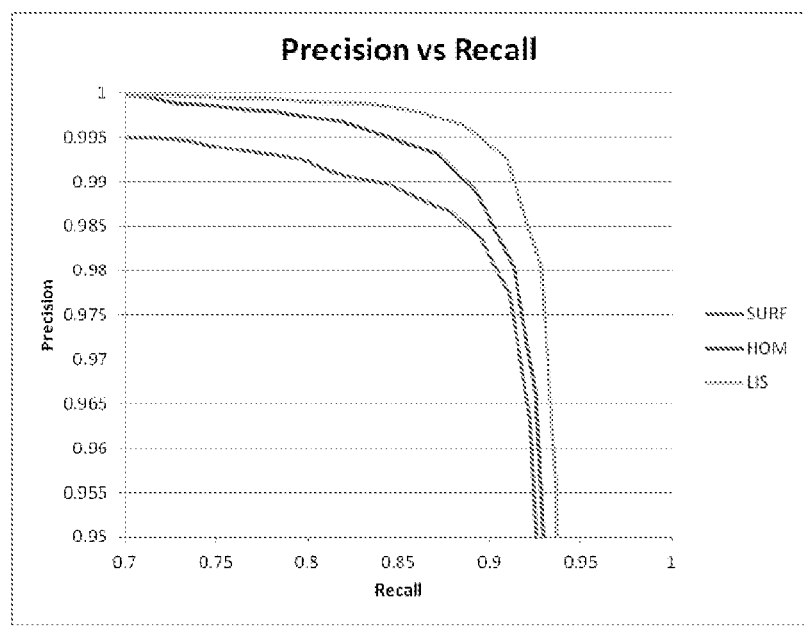
FIGS. 11 to 15 show graphs of the results of using LIS (longest increasing subsequence) and HOM (Homographic RANdom SAmple Consensus) geometric validation method compared against SURF (Speeded Up Robust Features without geometric validation).
Figure 12:
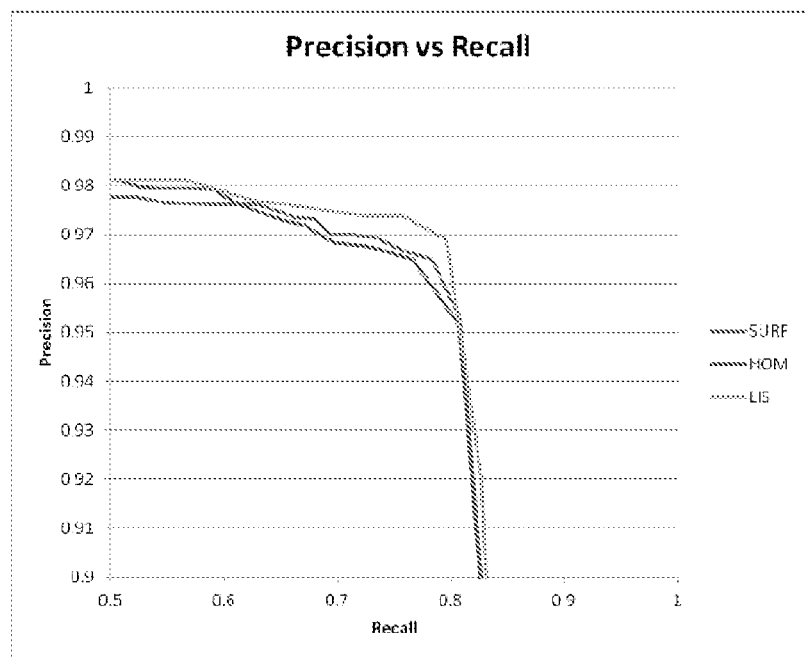

FIG. 10A shows an illustration of the implementation of an algorithm, based on a longest increasing subsequence method, used by various embodiments of a learning trail application to configure a processor (see processor 302 of FIG. 3A) to determine whether a match exists between an input image 1004 (which can also be the input image 326 of FIG. 3A) and an archived or stored image (see 310 of FIG. 3C) of the learning trail application. The geometric validation is illustrated for only one archived image 1010. The processor computes the geometric validation for all archived images in a similar manner.

In FIG. 10A, the gray squares 1002 denote a matching keypoint-pair between the input image 1004 and the archived or stored image 1010. Squares 1003 are also a keypoint-pair, similar to 1002. The remaining keypoint-pairs are indicated using the same reference numeral (1080 to 1085). For the sake of simplicity, lines connecting these reference numerals (1080 to 1085) to their respective squares do not span across the input image 1004 and the stored image 1010, unlike the case for reference numerals 1003 and 1002.

First, the keypoints are sorted according to their image coordinates on the x axis 1006 in the input image 1004. A sequence denoted 1005 is created. The values of the sequence elements are the keypoint indices in the order on the input image 1004. Then the keypoints are sorted according to their image coordinates of the x axis 1014 in the archived image 1010. Sequence 1012 shows an order of the keypoints along the x axis 1014 for the archived image 1010. The values of the sequence 1012 are the values from the sequence 1005 on the input image. The same indices (i.e. indice "0" refers to keypoint-pair 1082, indice "1" refers to keypoint-pair 1083, indice "2" refers to keypoint-pair 1085, indice "3" refers to keypoint-pair 1084, indice "4" refers to keypoint-pair 1003, indice "5" refers to keypoint-pair 1081, indice "6" refers to keypoint-pair 1002 and indice "7" refers to keypoint-pair 1080) corresponds to the members of each keypoint-pair in the sequences 1005 and 1012 respectively. The longest increasing subsequence of the sequence 1012 denoted in bold in 1020 will give the indices of the keypoints that are wanted (in the case of sequence 1020, the indices are 0, 2, 3, 4, 6 and 7). The keypoint-pairs whose indices are members of the longest increasing subsequence are geometrically consistent matches. The rest are outliers.

The input image 1004 is considered to match the stored image 1010 when the number of consistent matches is greater than a certain threshold.

Thus, from the above, an algorithm (such as the longest increasing subsequence method) configures a processor to select a plurality of matching features (1002, 1003, 1080, 1081, 1082, 1083, 1084 and 1085) in both the input image 1004 and a stored image 1010. The method may include the steps of having the algorithm configure the processor to: select a plurality of matching features (1002, 1003, 1080, 1081, 1082, 1083, 1084 and 1085) in both the input image 1004 and the stored image 1010; determining that the input image 1004 matches with the stored image 1010 when a subset of the matching features between the images (1004 and 1010) occur in the same geometric order in the input image 1004 and the stored image 1010 respectively, wherein the subset is larger than a threshold value. In various embodiments, the range of the threshold value may be from 0 to the number of keypoints detected from the input image 1004 or the stored image 1010, whichever is smaller.

The geometric order of the keypoints does not change when the images (1004, 1010) are translated or scaled. Thus, the algorithm is invariant for scaling and translation. A little elasticity in the transformations between the input image 1004 and the stored image 1010 is allowed as long as the geometric order of the keypoints does not change.

However, the algorithm is not invariant to rotation, affine transformation, and homographic transformations. These transformations can change the relative order of the keypoints.

Thus, when determining whether the input image 1004 matches with the stored image 1010, the processor can rotate either or both of the selected reference axis (1006 and 1014) used in both the input image 1004 and the stored image 1010.

In more detail, LIS can be calculated on rotated images multiple times. The rotation need only be applied on the keypoint coordinates, so that the whole image does not need to be rotated and features extracted again. Assuming that a correct angle of rotation is found, it can be proven that LIS is invariant to affine transformations.

Proof of Affine Invariance:

Let Affine:$\Re^2 \rightarrow \Re^2$ be an affine transformation. Affine(p)=Ap+t, where $$A = \begin{pmatrix} a & b \\ c & d \end{pmatrix}$$

is the affine transformation matrix, and $$t = \begin{pmatrix} e \\ f \end{pmatrix}$$

is the translation vector.

Let Rotate:$\Re^2 \rightarrow \Re^2$ be a rotation. Rotate(p)=Rp, where $$R = \begin{pmatrix} \cos(\alpha) & -\sin(\alpha) \\ \sin(\alpha) & \cos(\alpha) \end{pmatrix}$$

and $\alpha$ is the angle of the rotation. If an affine transformation is applied on a set of points P={$p_i \in \Re^2$}, and then rotation is applied, P'={$p'_i \in \Re^2$} is obtained, where $p'_i$=Rotate(Affine($p_i$)). The detailed equation is as follows:

$$\begin{pmatrix} x'_i \\ y'_i \end{pmatrix} = \begin{pmatrix} \cos(\alpha) & -\sin(\alpha) \\ \sin(\alpha) & \cos(\alpha) \end{pmatrix} \left( \begin{pmatrix} a & b \\ c & d \end{pmatrix} \begin{pmatrix} x_i \\ y_i \end{pmatrix} + \begin{pmatrix} e \\ f \end{pmatrix} \right)$$

where $$\begin{pmatrix} x_i \\ y_i \end{pmatrix} = p_i \text{ and } \begin{pmatrix} x_i \\ y_i \end{pmatrix} p_i.$$

The important is the difference between the x coordinates of two points, because that determines the geometrical order of the points according to the x axis. The indexes of the two points can be 0 and 1:

$x'_1 - x'_0 = (a \cdot \cos(\alpha) - c \cdot \sin(\alpha)) \cdot (x_1 - x_0) + (b \cdot \cos(\alpha) - d \cdot \sin(\alpha)) \cdot (y_1 - y_0)$ $\alpha$ can be chosen by the following:

$b = r \cdot \sin(\alpha)$ $d = r \cdot \cos(\alpha)$ where $\alpha, r \in \Re$ and $r \cdot \det(A) > 0$ assuming $\det(A) \neq 0$, which is always true in practice. This $\alpha$ will be the correct angle that is chosen. After the substitution, the equation will be:

$$x'_1 - x'_0 = (a \cdot \cos(\alpha) + c \cdot \sin(\alpha)) \cdot (x_1 - x_0) = \left( \frac{ad - bc}{r} \right) \cdot (x_1 - x_0)$$

Because $$\left( \frac{ad - bc}{r} \right) = \frac{\det(A)}{r} > 0,$$

the relative order of points applying a carefully chosen rotation can be preserved.

Consider a scenario where $\alpha$ is not known, because the parameters of the affine transformation are not known. Since computing LIS is very fast, the computations can be done multiple times. Several angles for the first and for the second image can be randomly chosen. LIS is computed for all possible angle-pairs (K*L if we have K and L angles for the images respectively). The inliers from the largest subset that are obtained are kept.

In various embodiments these angles are chosen described below. Rotation angles for the images can be obtained from the following:

$$\alpha = rand(0, 2\pi)$$
$$\alpha_k = a + \frac{k \cdot 2\pi}{K}$$
$$k = 0, 1 \ldots K - 1$$
$$\beta = rand(0, 2\pi)$$
$$\beta_l = \alpha + \frac{l \cdot 2\pi}{L}$$
$$l = 0, 1 \ldots L - 1$$

$\alpha_k$ values denote the rotation angles for the input image 1004, and $\beta_l$ are the angles for the archive image 1010. With sufficient sampling, suitable rotation angles can be located. Typical values are K=3 for the input image 1004 and L=7 for the stored image 1010.

FIG. 10B shows an instance where K=4 and L=4. The input image and the archive image are denoted by 1004 and 1010 respectively (as in FIG. 10A). There are 4 orientations (denoted by the arrows 1050, 1052, 1054, 1056, 1058, 1060, 1062 and 1064) for both images 1004 and 1010. Those arrows represent the axes of the rotated coordinate frames (compare with FIGS. 1006 and 1014). The horizontal arrows (1006 and 1014) denote the original orientation of the respective x axis. The bold arrows (i.e. 1050 and 1058) denote the rotated axis by a random angle α and β respectively (shown as 1030 and 1032 respectively in FIG. 10B). The arrows (1050, 1052, 1054, and 1056) denote the $\alpha_k$ angles. The arrows (1058, 1060, 1062, and 1064) denote the $\beta_l$ angles. The longest arrows (1056 and 1060) denote the axes where the best rotation-pairs occur, which provides the largest number of inliers when LIS is computed.

Experimental Results

It is known to use SURF feature matching to match a query image with the images in a database. As SURF feature matching result is not reliable, geometric validation is used as it is more reliable. Although the query time is longer due to the validation process, the recognition result is more accurate.

The results of LIS method compared against SURF and HOM (Homographic RANSAC) methods are shown in FIGS. 11-14. The experiments were conducted using 2 datasets.

Dataset A includes 1201 planar image categories, one image per category for training and another 8497 images for testing. Dataset B includes 130 Singapore landmarks. There are multiple images per landmark (total 3051 training images) for training and another 1630 images for testing. Experimental results show that LIS gives comparable results or outperforms the 2 existing methods. It is also faster, than the homographic RANSAC.

Definitions of Evaluation Criteria:

The recognition engine is tested with two different types of images: valid and invalid images. The test image is considered valid, if it contains an object which is in the database, so that the recognition engine should be able to recognize it correctly. The invalid images do not contain objects which are in the database.

When querying a valid image, there are three possible results:
  The image is correctly recognized (CR).
  The image is incorrectly recognized (IR). The engine outputs an object, but that object is not the one that the test image contains.
  The image is falsely rejected (Frej). The engine fails to recognize the object in the test image.

If the test image is invalid, there are two possible results:
  The image is falsely accepted (FA). The engine outputs an object, but the test image does not contain any object of interest.
  The image is correctly rejected (Crej). The engine does not find any match in the database, which is the correct answer, when the test image is invalid.

CR, IR, Frej, FA, Crej represents the number of correctly recognized, incorrectly recognized, falsely rejected, falsely accepted and correctly rejected images during the tests. The recognition engines output is the matching image in the database which has the most matching features with the query image. If the number of matching features is lower than a certain threshold, the image is rejected. So the five numbers defined above depend on the threshold. Performance evaluation measures are based on these five numbers.

Precision is defined as the ratio of number of correctly recognized images divided by the total recognized images. Recall is the ratio between the number of correctly recognized images and the total number of images. Both precision and recall is defined only on the valid test images. The values of the precision vs. recall curve is interpolated, such that the curve is monotone decreasing.

$$\text{precision} = \frac{CR}{CR + IR}$$
$$\text{recall} = \frac{CR}{CT + IR + Frej}$$

Figure 13:
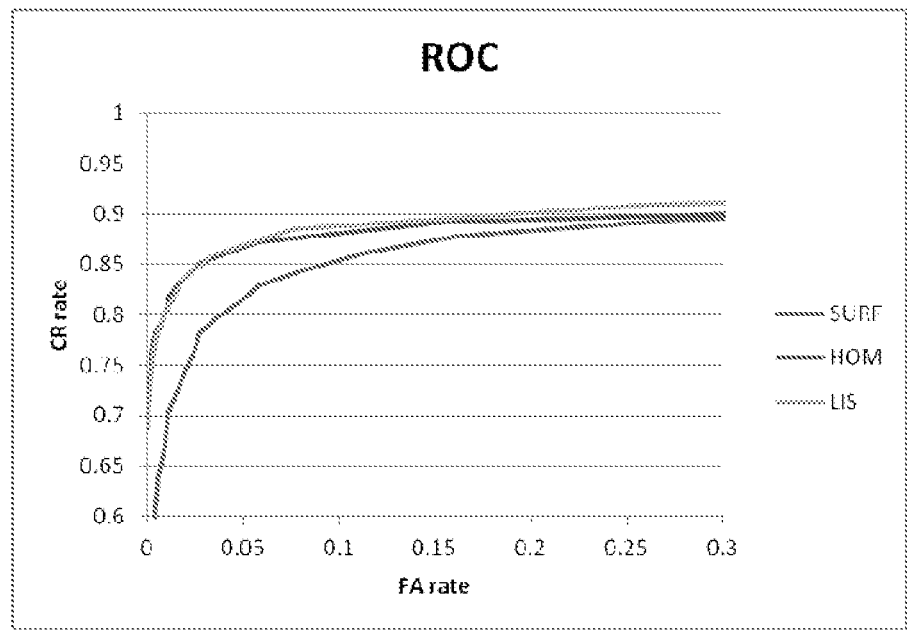
Figure 14:
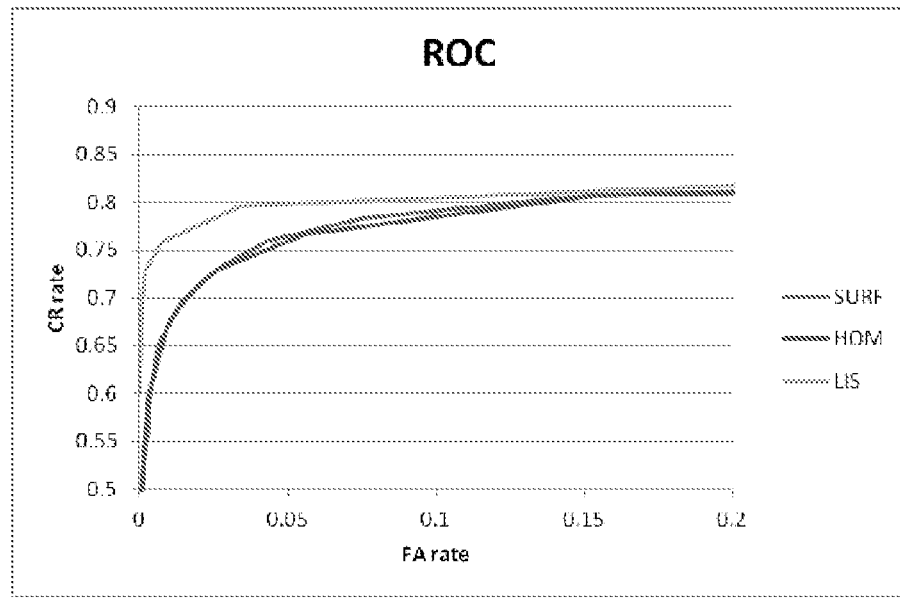

FIGS. 13 and 14 show ROC (Relative Operating Characteristic) curves plotted for both datasets. The x axis of the ROC curve is the false acceptance rate (FA/number of invalid images) and the y axis is the correct recognition rate (CR/number of valid images).

The precision vs. recall curves (FIGS. 11 and 12) and the ROC curves (FIGS. 13 and 14) show that both geometric validation method improves performance compared to simple SURF matching on the Database A. This database contains 2D images, so it is expected that the homographic method performs well. Indeed, the results are better than the SURF matching without geometric validation.

The LIS and homographic RANSAC perform equally based on the ROC curve, but LIS is better regarding the precision vs. recall metric. Dataset B contains 3D landmark images. On 3D objects the homographic constraint is not applicable. The results show that the RANSAC method has comparable performance to the simple SURF matching. It does not improve or make the performance worse significantly. The LIS outperform both the SURF matching and the homographic RANSAC on database B.

The average query time for the 3 methods is shown in Table 3 below. The results show that the LIS method consumes less computation time than the HOM method. This experiment was conducted on an Intel Xeon™ 5150 CPU having a 3.00 GHz processor and 3.00 GB RAM and running Windows™ XP SP3.

TABLE 3

| Comparison of average query time | | |
|---|---|---|
| Average query time (ms) | Dataset A | Dataset B |
| SURF | 22.5 | 53.2 |
| HOM | 55.3 | 73.6 |
| LIS | 37.7 | 72.1 |

Figure 15:
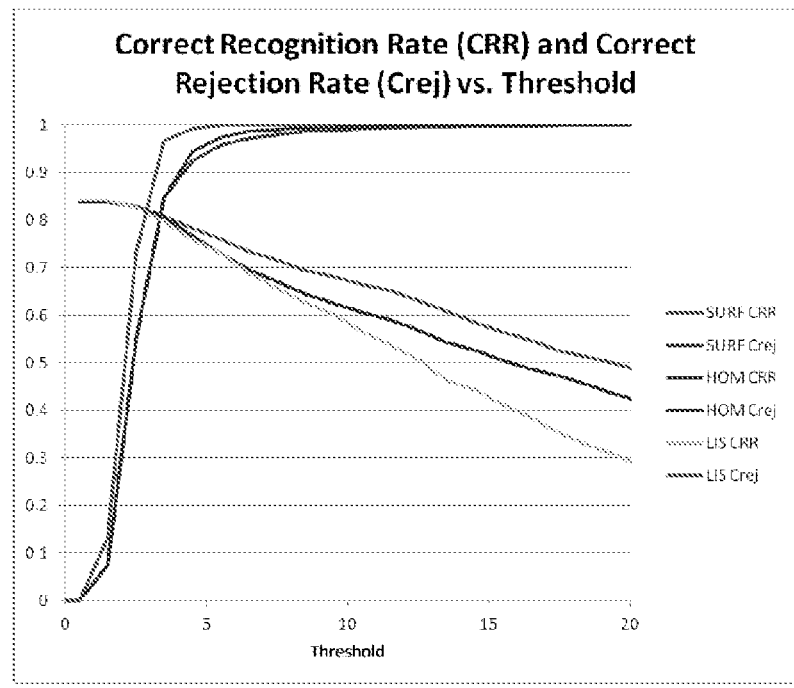

Many image classification algorithms require parameters to be fine tuned to maximize classification accuracy. The same set of parameters may not work well for all datasets as they depend on image contents. As shown in FIG. 15 (showing experimental results on Dataset A), both the correct recognition rate and the correct rejection rate depend on a threshold, which is one of the parameters to be decided in the algorithms.

Thus it is useful to automate the parameter tuning process, as sample images uploaded by authors may be very different and image content is unpredictable. The methods and software will be developed to fine tune the parameters to achieve the best recognition accuracy.

It will be appreciated by a person skilled in the art that numerous variations and/or modifications may be made to the present invention as shown in the specific embodiments without departing from the spirit or scope of the invention as broadly described. The elements of the various embodiments may be incorporated into each of the other species to obtain the benefits of those elements in combination with such other species, and the various beneficial features may be employed in embodiments alone or in combination with each other. The present embodiments are, therefore, to be considered in all respects to be illustrative and not restrictive.

The invention claimed is:

1. A server configured to create a learning trail application for a geographic area, the server comprising:
a processor configured to:
provide a template having a plurality of fields, each performing a specific function, the plurality of fields comprising a location field and an image archive field, the location field configured to receive the geographic area and the image archive field configured to receive images;
receive template data for placement as the content of one or more of the plurality of fields;
receive instructions for determining the placement of the template data into one or more of the plurality of fields;
generate the learning trail application from the template with the received template data, wherein during execution of the learning trail application, the learning trail application is configured to receive at least one input image, determine whether a match exists between the input image and the content in the image archive field and display the template data associated with the content in the image archive field, when a match exists;
use an algorithm to determine whether the match exists between the input images in the learning trail application and the content in the image archive field, wherein the algorithm is based on a longest increasing subsequence method; and
having the algorithm configure the processor to select a plurality of matching features in both the input image and a stored image and determine that the input image matches with the stored image when a subset of the matching features between the images occur in the same geometric order in the input image and the stored image respectively, wherein the subset is larger than a threshold value.

2. The server of claim 1, wherein during execution of the learning trail application, the learning trail application displays the template data that is associated to the input image received during execution of the learning trail application.

3. The server of claim 1, wherein during execution of the learning trail application, the learning trail application prompts a user to provide the input image.

4. The server of claim 1, wherein during execution of the learning trail application, the learning trail application is further configured to display the template data when the learning trail application receives data generated by sensors operating in a platform where the learning trail application is executed.

5. The server of claim 4, where the data includes any one or more of the following: GPS data, compass bearing data or accelerometer data.

6. The server of claim 1, wherein the processor is further configured to perform authentication before displaying the template, further configured to have the template accessible by a web browser application, or further configured to receive instructions for associating the content between one or more of the plurality of fields.

7. The server of claim 1, wherein the template data comprises information relating to the received images or the geographic area.

8. The server of claim 7, wherein the plurality of fields of the template further comprises a question field configured to receive questions related to the geographic area and an answer field configured to receive answers to the respective questions in the question field, wherein the template data comprises the content for the question field and the answer field, wherein the input data used by the learning trail application comprises replies to questions from the content of the question field and wherein the learning trail application is further configured to determine whether the replies match the content in the answer field.

9. The server of claim 7, wherein the template data comprises geographic area for placement into the location field of the template.

10. The server of claim 1, wherein the template data comprises images captured from an object of interest for placement into the image archive field of the template, the object of interest being an object to which information is associated.

11. The server of claim 10, wherein the processor is further configured to process the images captured from the object of interest with an algorithm to select images that are representative of the object of interest and to remove noise from the selected images.

12. The server of claim 1, wherein the learning trail application is configured to have at least a portion of the template data displayed only when the learning trail application is executed in a specified segment of the geographic area.

13. The server of claim 12, wherein the portion of the template data that is displayed is associated with the specified segment of the geographic area.

14. The server of claim 1, wherein the learning trail application is downloadable into a platform that is separate from the server and executable on the platform.

15. The server of claim 14, wherein the processor is further configured to provide an accessing application that is configured to run the learning trail application, wherein the accessing application is configured to operate on the platform and wherein the accessing application is further configured to perform authentication before running the learning trail application.

16. The server of claim 1, wherein the longest increasing subsequence method comprises having the algorithm configure the processor to further:

rotate either or both of a selected reference axis used in both the input image and the stored image to determine whether the input image matches with the stored image.

17. The server of claim 1, wherein either or both of the selected reference axes are randomly rotated.

* * * * *